US012651012B2

(12) United States Patent
Das et al.

(10) Patent No.: US 12,651,012 B2
(45) Date of Patent: Jun. 9, 2026

(54) DETERMINING INTENTS AND RESPONSES USING MACHINE LEARNING IN CONVERSATIONAL AI SYSTEMS AND APPLICATIONS

(71) Applicant: NVIDIA Corporation, Santa Clara, CA (US)

(72) Inventors: Shubhadeep Das, Kolkata (IN); Sumit Kumar Bhattacharya, Pune (IN); Oluwatobi Olabiyi, Falls Church, VA (US)

(73) Assignee: NVIDIA Corporation, Santa Clara, CA (US)

( * ) Notice: Subject to any disclaimer, the term of this patent is extended or adjusted under 35 U.S.C. 154(b) by 278 days.

(21) Appl. No.: 18/173,610

(22) Filed: Feb. 23, 2023

(65) Prior Publication Data

US 2023/0205797 A1 Jun. 29, 2023

Related U.S. Application Data

(60) Provisional application No. 63/429,409, filed on Dec. 1, 2022.

(51) Int. Cl.
*G06F 16/3329* (2025.01)

(52) U.S. Cl.
CPC ................................. *G06F 16/3329* (2019.01)

(58) Field of Classification Search
CPC ........... G06F 16/3329; G06F 16/90332; G06F 16/9032; G06F 18/22; G06F 18/24; G06F 40/30; G10L 15/1822; G10L 15/18; G06N 20/00
See application file for complete search history.

(56) References Cited

U.S. PATENT DOCUMENTS

| | | | |
|---|---|---|---|
| 10,388,274 B1 | 8/2019 | Hoffmeister | |
| 10,762,438 B1 | 9/2020 | Zhang et al. | |
| 11,474,519 B2 | 10/2022 | Hicok et al. | |
| 11,709,873 B2 | 7/2023 | Xiao et al. | |

(Continued)

OTHER PUBLICATIONS

Das, Shubhadeep; Non-Final Office Action for U.S. Appl. No. 18/173,622, filed Feb. 23, 2023, mailed Apr. 23, 2025, 22 pgs.

(Continued)

*Primary Examiner* — Huyen X Vo
(74) *Attorney, Agent, or Firm* — IRON SUMMIT IP LLP

(57) ABSTRACT

In various examples, hybrid models for determining intents in conversational AI systems and applications are disclosed. Systems and methods are disclosed that use a machine learning model(s) and a data file(s) that associates intents with one another (e.g., using a tree-like structure) in order to determine a final intent associated with text. For example, the text may initially be processed using the machine learning model(s) (e.g., a first machine learning model) in order to determine a first intent associated with the text. The data file(s) may then be used to determine information (e.g., anchors) for one or more second intents (e.g., one or more sub-intents) that are related to the first intent. The text and the information may then be processed using the machine learning model(s) (e.g., a second machine learning model) to determine a second intent, from the one or more second intents, that is associated with the text.

20 Claims, 15 Drawing Sheets

(56)        References Cited

U.S. PATENT DOCUMENTS

| | | | |
|---|---|---|---|
| 2018/0137401 A1* | 5/2018 | Kumar | G06F 16/245 |
| 2019/0180009 A1 | 6/2019 | Li et al. | |
| 2019/0265703 A1 | 8/2019 | Hicok et al. | |
| 2020/0349940 A1* | 11/2020 | Ko | G10L 15/187 |
| 2020/0364303 A1 | 11/2020 | Liu et al. | |
| 2022/0026987 A1 | 1/2022 | Hu et al. | |
| 2022/0035799 A1* | 2/2022 | Bhutada | G06F 40/30 |
| 2022/0284889 A1* | 9/2022 | Travaglini | G10L 15/1822 |
| 2023/0101424 A1* | 3/2023 | Agrawal | G06F 18/41 |
| | | | 705/7.39 |
| 2023/0122874 A1* | 4/2023 | Gupta | G06F 18/24 |
| | | | 707/723 |
| 2023/0169273 A1* | 6/2023 | Koneru | G06F 40/30 |
| | | | 704/9 |
| 2024/0160675 A1* | 5/2024 | Pham | G06N 3/045 |
| 2024/0184814 A1 | 6/2024 | Das et al. | |

OTHER PUBLICATIONS

Das, Shubadeep, Final Office Action for U.S. Appl. No. 18/173,622, filed Feb. 23, 2023, mailed Oct. 16, 2025, 20 pgs.

Das, Shubadeep, Non-Final Office Action for U.S. Appl. No. 18/173,622, filed Feb. 23, 2023, mailed Apr. 30, 2026, 15 pgs.

\* cited by examiner

1000

DETERMINE, USING ONE OR MORE MACHINE LEARNING MODELS AND BASED AT LEAST ON TEXT DATA REPRESENTING A REQUEST, A FIRST INTENT ASSOCIATED WITH THE REQUEST
B1002

DETERMINE, USING THE ONE OR MORE MACHINE LEARNING MODELS AND BASED AT LEAST ON THE TEXT DATA AND DATA ASSOCIATED WITH ONE OR MORE SECOND INTENTS THAT ARE RELATED TO THE FIRST INTENT, A SECOND INTENT OF THE ONE OR MORE SECOND INTENTS THAT IS ASSOCIATED WITH THE REQUEST
B1004

OUTPUT, BASED AT LEAST ON THE SECOND INTENT, A RESPONSE TO THE REQUEST
B1006

1200

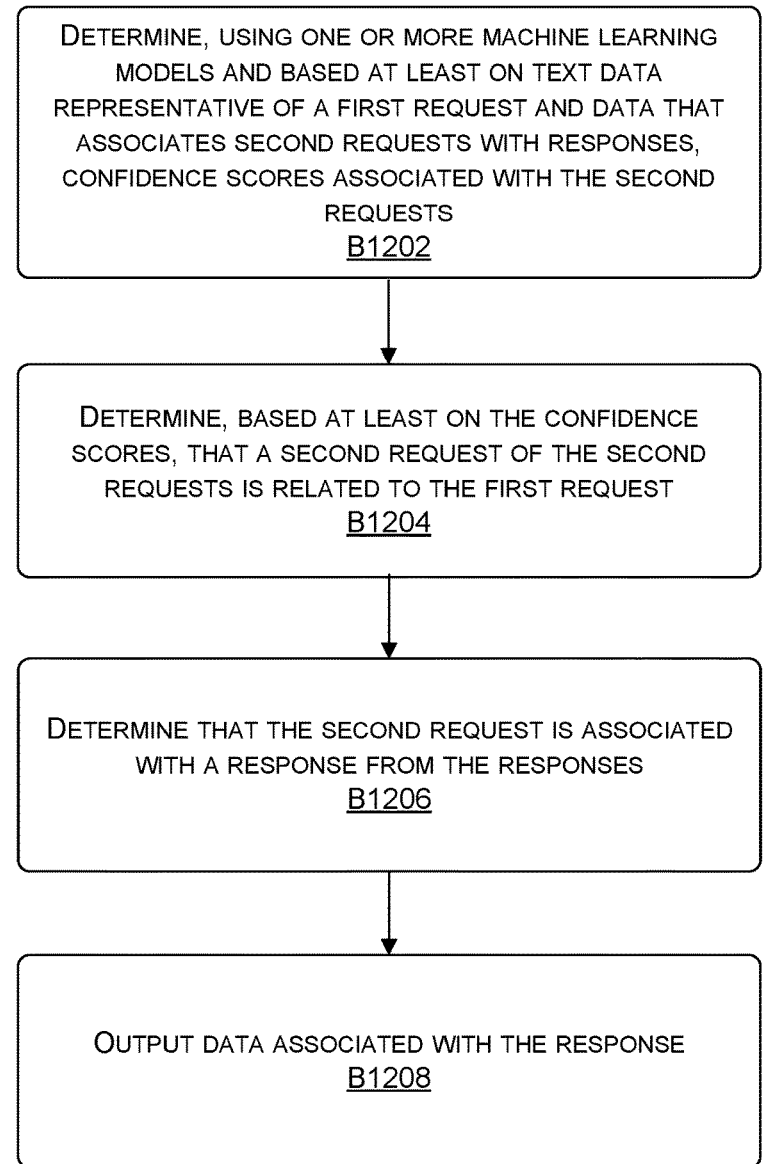

DETERMINE, USING ONE OR MORE MACHINE LEARNING MODELS AND BASED AT LEAST ON TEXT DATA REPRESENTATIVE OF A FIRST REQUEST AND DATA THAT ASSOCIATES SECOND REQUESTS WITH RESPONSES, CONFIDENCE SCORES ASSOCIATED WITH THE SECOND REQUESTS
B1202

DETERMINE, BASED AT LEAST ON THE CONFIDENCE SCORES, THAT A SECOND REQUEST OF THE SECOND REQUESTS IS RELATED TO THE FIRST REQUEST
B1204

DETERMINE THAT THE SECOND REQUEST IS ASSOCIATED WITH A RESPONSE FROM THE RESPONSES
B1206

OUTPUT DATA ASSOCIATED WITH THE RESPONSE
B1208

DETERMINING INTENTS AND RESPONSES USING MACHINE LEARNING IN CONVERSATIONAL AI SYSTEMS AND APPLICATIONS

CROSS-REFERENCE TO RELATED APPLICATIONS

This application claims the benefit of U.S. Provisional Application No. 63/429,409, filed on Dec. 1, 2022, which is hereby incorporated by reference in its entirety.

BACKGROUND

Dialogue systems are used in many different applications, such as applications for requesting information (e.g., requesting information about objects, features, etc.), scheduling travel plans (e.g., booking arrangements for transportation and accommodations, etc.), planning activities (e.g., making reservations, etc.), communicating with others (e.g., making phone calls, starting video conferences, etc.), shopping for items (e.g., purchasing items from online marketplaces, ordering food from a local restaurant, etc.), and/or so forth. Some dialogue systems operate by receiving text—such as text including one or more letters, words, sub-words, numbers, and/or symbols—that is generated using an input device and/or generated as a transcript of spoken language. The dialogue systems then process the text using one or more models that are trained to interpret the text. For instance, the model(s) may initially determine an intent associated with the text and then generate an output that is based on the intent.

As such, intent classification and identification is important for the operation of dialogue systems. In order to perform intent classification and identification, some dialogue systems may use intent-slot-based models that are trained for each of the intents that the intent-slot-based models are configured to interpret. However, training an intent-slot-based model for interpreting multiple intents may require collection of an extensive dataset (e.g., thousands to millions of training samples). For example, if an intent-slot-based model is being trained to interpret fifty different intents, then training the intent-slot-based model for each intent may require a large number of training samples (e.g., ten training samples, fifty training samples, one hundred samples, etc.) that are specific to the respective intent. As such, the greater the number of intents that these intent-slot-based models are trained to interpret, the greater the amount of training data, computing resources, and/or time that is needed to train the intent-slot-based models.

Because of this, other dialogue systems may use zero-shot models that are able to differentiate between various intents using anchors. For example, a zero-shot model may be associated with a number of intents, where each of the intents is further associated with one or more anchors (e.g., example queries). As such, to interpret text, the zero-shot model may determine that the text is related to one of the anchors and use the identified anchor to determine an intent associated with the input text. However, zero-shot models tend to require a larger amount of computing resources to operate as compared to intent-slot-based models. Additionally, the zero-shot models sometimes have lower accuracy as compared to the intent-slot-based models which, as described herein, are specifically trained for each of the intents that the intent-slot-based models interpret.

SUMMARY

Embodiments of the present disclosure relate determining intents and responses using machine learning in conversational AI systems and applications. Systems and methods are disclosed that use a machine learning model(s) and a data file(s) that associates intents with one another (e.g., using a tree-like structure) in order to determine a final intent associated with text. For example, the text may initially be processed using the machine learning model(s) (e.g., a first machine learning model) in order to determine a first intent associated with the text. The data file(s) may then be used to determine information (e.g., anchors) for one or more second intents (e.g., one or more sub-intents) that are related to the first intent. Next, the text and the information may be processed using the machine learning model(s) (e.g., a second machine learning model or the same first machine learning model) to determine a second intent, from the one or more second intents, that is associated with the text. This process may then be repeated in order to determine a final intent associated with the text.

In contrast to conventional systems, such as conventional systems that use the intent-slot-based models described above, the current systems, in some embodiments, are able to identify intents associated with text without training the machine learning model(s) for every intent. Rather, the current systems are able to determine the intents associated with the text using the associations between the intents and the information (e.g., anchors) associated with the intents. As described herein, reducing the number of intents that the machine learning model(s) is specifically trained to interpret may reduce the amount of training data, computing resources, and/or time needed to train the machine learning model(s).

Additionally, in contrast to the conventional systems, such as the conventional systems that use the zero-shot models described above, the current systems, in some embodiments, are able to determine the intents associated with the text using fewer computing resources. For instance, rather than processing information (e.g., anchors) associated with every intent, the current systems may only process information (e.g., anchors) associated with one or more sub-intents that are related to an already identified intent. Additionally, in contrast to these conventional systems, the current systems, in some embodiments, are able to more accurately determine intents associated with text using the associations between the intents, the information associated with the intents, and the various processing operations that are used to continue identifying sub-intents until a final intent associated with the text is identified.

Systems and methods are also disclosed that use a machine learning model(s) and a data file(s) that associates requests (e.g., questions) with responses (e.g., answers) in order to generate final responses to requests. For instance, the machine learning model(s) may determine confidence scores that indicate similarities between the requests from the data file(s) and an input request represented by text data. The data file(s) is then used to determine, based on the confidence scores, one of the responses that is associated with one of the requests that is related to the input request. Additionally, the response is then used to generate a final response to the input request.

BRIEF DESCRIPTION OF THE DRAWINGS

The present systems and methods for determining intents and responses using machine learning in conversational AI systems and applications are described in detail below with reference to the attached drawing figures, wherein:

FIG. 10 is a flow diagram showing a method for generating a response to a request, in accordance with some embodiments of the present disclosure;

FIG. 12 is a flow diagram showing a method for using request/response pairs to determine a response to a request, in accordance with some embodiments of the present disclosure;

DETAILED DESCRIPTION

Figure 1:
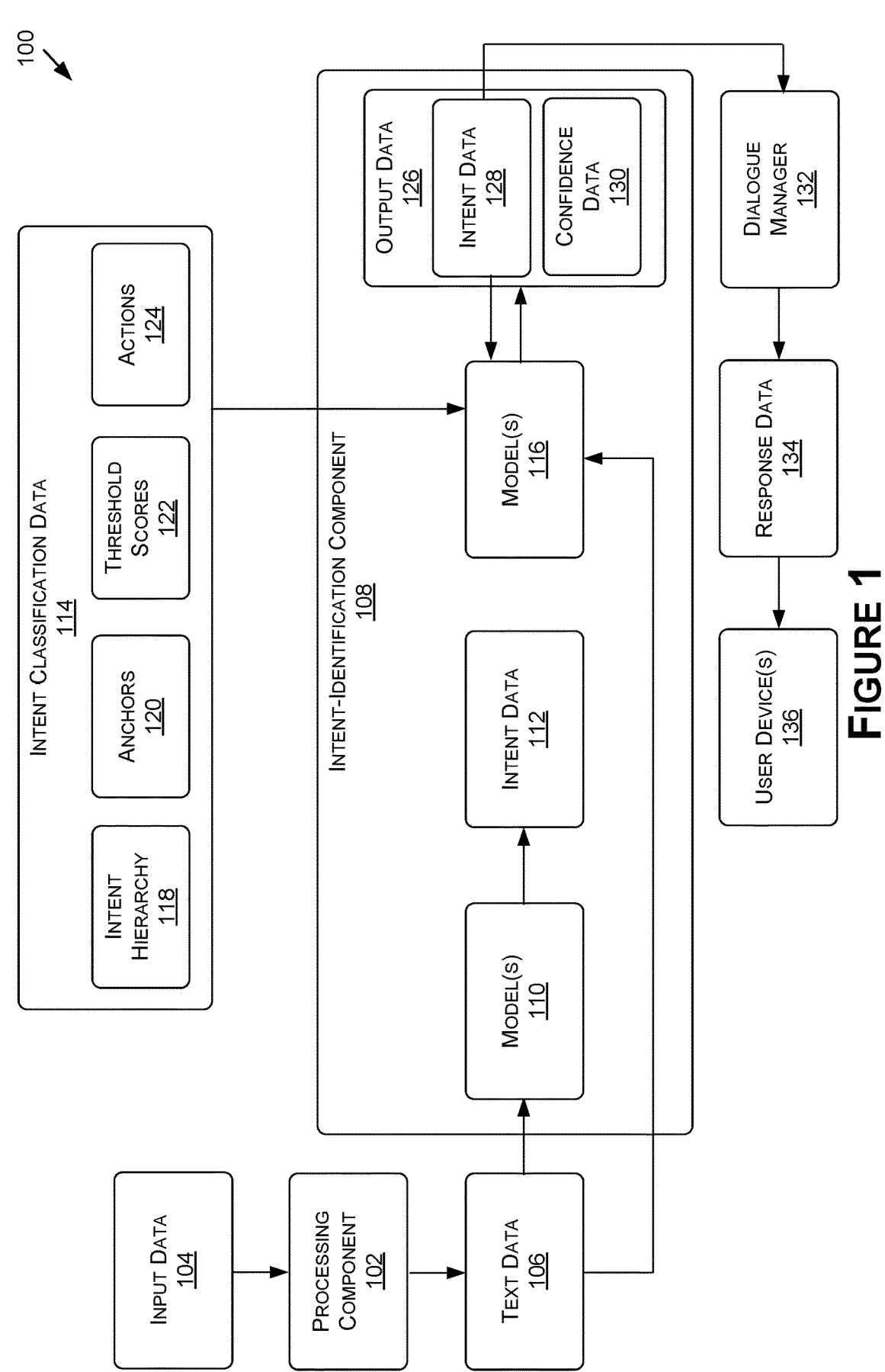
FIG. 1 illustrates an example data flow diagram for a process of using a machine learning model(s) to determine an intent associated with a request and to determine a response to the request, in accordance with some embodiments of the present disclosure.

Systems and methods are disclosed related to determining intents and responses using machine learning in conversational AI systems and applications. For instance, a system(s) may store data (also referred to as a data file(s)) that associates intents with one another and/or associates intents with information. For example, the data file(s) may associate a first intent with one or more second intents (e.g., a first level of sub-intents), associate one or more of the second intent(s) with one or more third intents (e.g., a second level of sub-intents), associate one or more of the third intent(s) with one or more fourth intents (e.g., a third level of sub-intents), and/or so forth. Additionally, the data file(s) may associate one or more (e.g., each) of the intents with information, where the information associated with an intent may include an anchor(s) associated with the intent, a confidence threshold(s) associated with the intent, an action(s) associated with the intent, and/or any other information.

The system(s) may then use one or more machine learning models, along with the data file(s), to determine intents associated with text data. For instance, the system(s) may receive and/or generate text data representing a request, such as text data representing one or more letters, words, numbers, and/or symbols. For a first example, the system(s) may receive, from a user device, audio data representing user speech and then process the audio data to generate the text data (e.g., text representing a transcript and/or diarization of the user speech). For a second example, the system(s) may receive, from a user device, the text data representing the request. In any of these examples, the request may include a query for information associated with a topic (e.g., an object, item, feature, etc.), a request to perform an action associated with a topic (e.g., schedule a dinner reservation, book a trip, generate a list, provide content, etc.), and/or any other type of request. The system(s) may then process the text data, using the machine learning model(s), in order to determine the intent associated with the request.

As described herein, an intent may include, but is not limited to, booking a reservation (e.g., booking a plane flight, booking a hotel, booking a dinner reservation, etc.), scheduling an event (e.g., scheduling a birthday party, scheduling a sporting match, etc.), starting a communication (making a phone call, starting a video conference, etc.), creating a list (e.g., creating a shopping list, creating a to-do list, etc.), acquiring an item and/or service, requesting information associated with an item and/or service, and/or any other intent. To identify the intent, the system(s) may initially process the text data using a machine learning model(s) (e.g., a first machine learning model, such as a first intent-slot-based model, a first zero-shot model, etc.) that is trained to determine a first intent associated with the text data. The system(s) may then use the data file(s) to determine that the first intent is associated with second intents (e.g., first level sub-intents) and/or determine the information associated with the second intents.

The system(s) may then process the text data along with data representing the information associated with the second intents using a machine learning model(s). In some examples, the text data and the data representing the information are processed using the same machine learning model(s) while, in other examples, the text data and the data representing the information are processed using the same or a different machine learning model(s) (e.g., a second machine learning model, such as a second intent-slot-based model, a second zero-shot model, etc.). In any of the examples, based on the processing, the machine learning model(s) may determine a respective confidence score for one or more (e.g., each) of the second intents that are related to the first intent. The system(s) (e.g., machine learning model(s)) may then select one of the second intents that is associated with a confidence score that satisfies (e.g., is equal to or greater than) a threshold score, or the system(s) may determine to use the first intent when the confidence score(s) does not satisfy (e.g., is less than) the threshold score.

In some examples, the system(s) may repeat these processes (e.g., identifying information for a related intent(s), processing the information and the text data using the machine learning model(s) to determine a new intent, etc.) until the occurrence of one or more events. For a first example, and as described herein, the intents may be related using a tree-like structure such that there are different levels of intents. As such, the system(s) may continue to perform these processes until reaching the last level of intents. For a second example, and also as described herein, the system(s) may determine whether the confidence score(s) for a level of intents satisfies a threshold score. As such, the system(s)

may continue to perform these processes until determining that the confidence score(s) for a level of intents does not satisfy the threshold score. While these are just a couple examples of events that the system(s) may use to identify a final intent when processing the text data, in other examples, the system(s) may use additional and/or alternative events.

The system(s) may then use the final intent associated with the text data to generate output data associated with the request, where the output data may represent a response. In some examples, the system(s) may generate the output data using the data file(s). For example, and as described herein, the data file(s) may associate one or more of the intents with one or more actions, where an action may indicate a structure for a response. As such, the system(s) may use the action(s) associated with the final intent to generate the output data. Additionally, or alternatively, in some examples, the system(s) may generate the output data using another machine learning model(s) that is trained to process the text data, along with the final intent, in order to generate the output data.

In some examples, in addition to, or alternatively from, using the data file(s) associated with the intents, the system(s) may use a data file(s) that associates requests (e.g., questions) with responses (e.g., answers or replies) to generate the output data. For example, the data file(s) may associate a first pair of requests for a first response(s), a second pair of requests with a second response(s), a third pair of requests with a third response(s), and/or so forth. The system(s) may then process the text data and the data file(s) using a machine learning model(s) in order to determine that the text data is related to one of the requests. For example, the machine learning model(s) may be trained to output a respective confidence score associated with one or more (e.g., each) of the requests. In some examples, the system(s) may then determine that the text data is related to the request that includes the highest confidence score. In some examples, the system(s) may determine that the text data is related to the request that includes the highest confidence score that also satisfies (e.g., is equal to or greater than) a threshold score.

The system(s) may then use the related request to generate the output data. For a first example, if the related request is associated with a single response, then the system(s) may generate the output data using the response. For a second example, if the related request is associated with multiple responses, then the system(s) may generate the output data using at least one of the responses. In such an example, the system(s) may randomly select the response for generating the output data and/or the system(s) may use one or more additional techniques to select the response for generating the output data.

In some examples, the system(s) may combine these techniques in order to generate output data associated with text data. For instance, the system(s) may perform the processes described herein, using the data file(s) associated with the intents, to determine a final intent that is associated with the text data. The system(s) may then perform the processes described herein, using the data file(s) associated with the request/response pairs, to generate the output data based on the final intent. For example, the data file(s) may associate the final intent with one or more question/answer pairs. As such, after identifying the final intent, the system(s) may perform the processes described herein to identify the response that is associated with the text data. The system(s) may then generate the output data using the response.

The systems and methods described herein may be used for a variety of purposes, by way of example and without limitation, for use in systems associated with machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., an in-vehicle infotainment (IVI) system of an autonomous, semi-autonomous, or non-autonomous vehicle or machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for generating or presenting a digital avatar, systems for performing light transport simulation, systems for performing collaborative content creation for 3D assets, systems implemented at least partially using cloud computing resources, and/or other types of systems.

With reference to FIG. 1, FIG. 1 illustrates an example data flow diagram for a process 100 of using a machine learning model(s) to determine an intent associated with a request and to determine a response to the request, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 100 may include a processing component 102 receiving input data 104, such as from a user device. In some examples, the input data 104 may include audio data generated (e.g., using a microphone(s)) and/or sent by the user device, where the audio data represents user speech from one or more users. Additionally, or alternatively, in some examples, the input data 104 may include text data generated (e.g., using a keyboard, touchscreen, and/or other input device) and/or sent by the user device, where the text data represents one or more letters, words, numbers, and/or symbols. While these are just a couple example types of data that the input data 104 may include, in other examples, the input data 104 may include any other type of data (e.g., image data, video data, sensor data, etc.).

The process 100 may include the processing component 102 processing the input data 104 in order to generate text data 106. For a first example, such as when the input data 104 includes audio data representing user speech, the processing component 102 may include one or more speech-processing models, such as an automatic speech recognition (ASR) model(s), a speech to text (STT) model(s), a natural language processing (NLP) model(s), a diarization model(s), and/or the like, that is configured to generate the text data 106 associated with the audio data. For instance, the text data 106 may represent a transcript (e.g., one or more letters, words, symbols, numbers, etc.) associated with the user speech. For a second example, such as when the input data 104 includes text data, the process 100 may not include the processing component 102 such that the text data 106 includes the input data 104 and/or the processing component 102 may process the text represented by the input data 104 in order to convert the text into a format associated with the text data 106.

The process 100 may include an intent-identification component 108 inputting the text data 106 into a model(s) 110 (also referred to, in some examples, as a "first model(s) 110) for processing (e.g., using one or more neural networks). For example, the first model(s) 110 may include an intent-slot-based model(s), a zero-shot model(s), a semantic model(s), an internment model(s), and/or any other type of model that is trained to process the text data 106 in order to identify one or more intents associated with the text. As described herein, an intent may include, but is not limited to, booking a reservation (e.g., booking a plane flight, booking a hotel, booking a dinner reservation, etc.), scheduling an event (e.g., scheduling a birthday party, scheduling a sporting match, etc.), starting a communication (making a phone call, starting a video conference, etc.), creating a list (e.g., creating a shopping list, creating a to-do list, etc.), acquiring an item and/or service, requesting information associated with an item and/or service, and/or any other intent. For a first example, if the text data 106 represent text (e.g., a request) that includes "What items are available on the menu," then the intent may include "querying menu" or "requesting menu information." For a second example, if the text data 106 represents text (e.g., a request) that includes "How much does that item cost," then the intent may include "querying price" or "requesting price information."

In some examples, based on the processing, the first model(s) 110 may identify a single intent associated with the text data 106. In some examples, based on the processing, the first model(s) 110 may identify multiple intents associated with the text data. In either of the examples, the first model(s) may generate and then output intent data 112 representing the identified intent(s).

The process 100 may include the intent-identification component 108 inputting the text data 106 and at least a portion of intent confidence data 114 into a model(s) 116 (also referred to, in some examples, as a "second model(s) 116") for processing (e.g., using one or more neural networks). The second model(s) 116 may include an intent-slot-based model(s), a zero-shot model(s), a semantic model(s), an internment model(s), and/or any other type of model that is trained to process the text data 106 in order to identify one or more intents associated with the text. While the example of FIG. 1 illustrates the second model(s) 116 as being separate from the first model(s) 110, in other examples, the second model(s) 116 may include the first model(s) 110.

As shown by the example of FIG. 1, the intent confidence data 114 may represent information associated with intents, such as an intent hierarchy 118, anchors 120, threshold scores 122, and/or actions 124 associated with the intents. In some examples, the intent confidence data 114 may correspond to one or more data files that include the information. For a first example, the intent confidence data 114 may represent a single file that includes information associated with a single intent hierarchy 118. For a second example, the intent confidence data 114 may represent multiple files that includes information associated with a single intent hierarchy 118. Still, for a third example, the intent confidence data 114 may represent one or more files that include information associated with multiple intent hierarchies 118.

The intent hierarchy 118 may indicate the relationships between the intents. For example, the intent hierarchy 118 may indicate a first intent(s) associated with a first intent level, a second intent(s) associated with a second intent level (e.g., a first sub-intent level), a third intent(s) associated with a third intent level (e.g., a second sub-intent level), a fourth intent(s) associated with a fourth intent level (e.g., a third sub-intent level), and/or so forth. In some examples, the intent hierarchy 118 may include any number of intent levels. For example, the intent hierarchy may include, but is not limited to, one intent level, two intent levels, five intent levels, ten intent levels, and/or any other number of intent levels. In some examples, the intent(s) associated with an intent level includes a sub-intent(s) for the intent(s) from the preceding intent level. For instance, and using the example above, the second intent(s) associated with the second intent level may include a sub-intent(s) for the first intent(s) associated with the first intent level, and the third intent(s) associated with the third intent level may include a sub-intent(s) for the second intent(s) associated with the second intent level.

Figure 2:
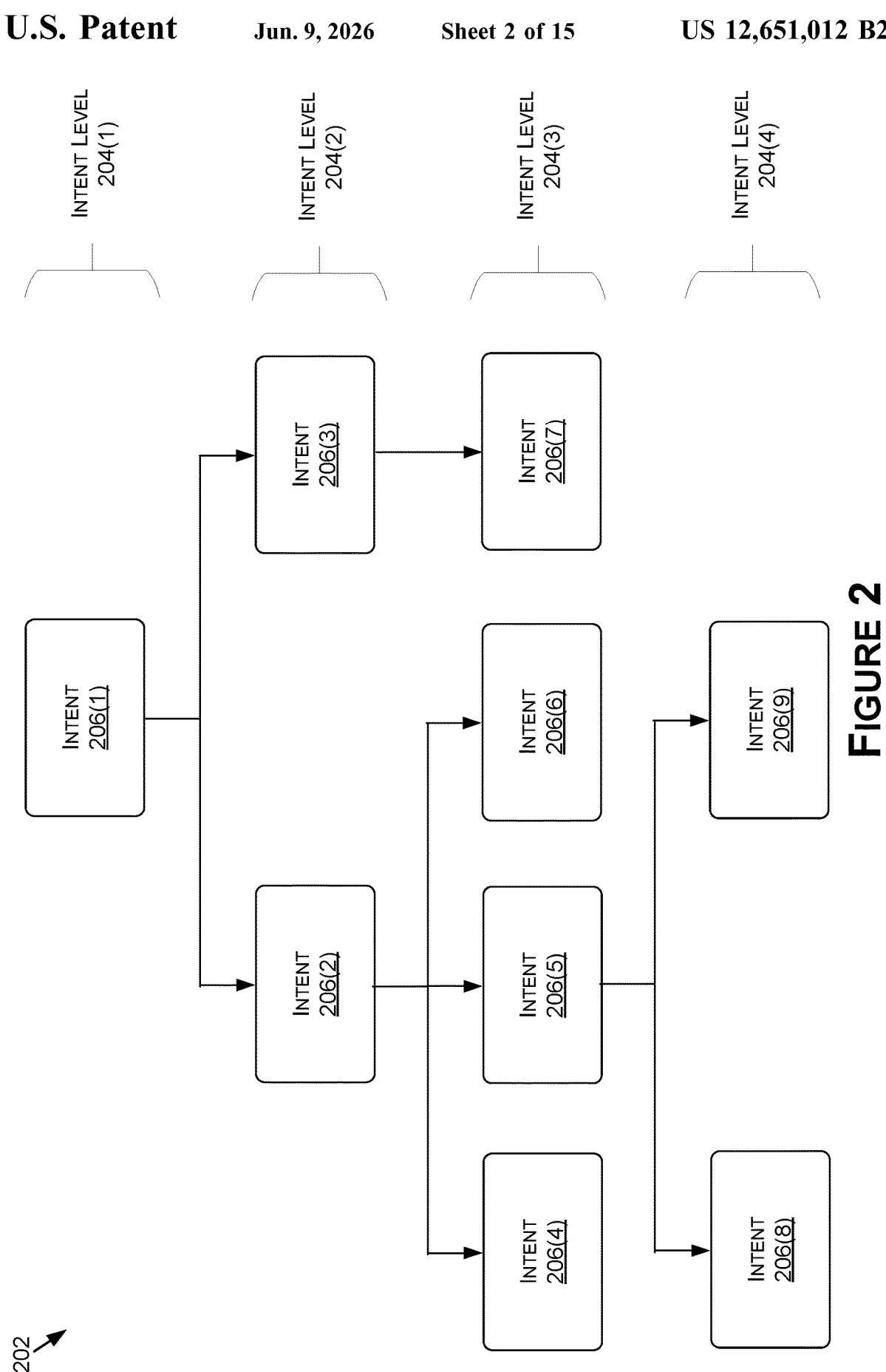
FIG. 2 illustrates an example of a hierarchy associated with intents, in accordance with some embodiments of the present disclosure.

For instance, FIG. 2 illustrates an example of an intent hierarchy 202 (which may represent, and/or include, an intent hierarchy 118) associated with intents, in accordance with some embodiments of the present disclosure. In the example of FIG. 2, a first intent level 204(1) may include a first intent 206(1), a second intent level 204(2) may include a second intent 206(2) and a third intent 206(3), a third intent level 204(3) may include a fourth intent 206(4), a fifth intent 206(5), a sixth intent 206(6), and a seventh intent 206(7), and a fourth intent level 204(4) may include an eighth intent 206(8) and a ninth invent 206(9). While the example of FIG. 2 illustrates the intent hierarchy 202 as including four intent levels 204(1)-(4) and nine intents 206(1)-(9), in other examples, the intent hierarchy 202 may include any number of intent levels and/or any number of intents.

In the example of FIG. 2, the second intent 206(2) and the third intent 206(3) included in the second intent level 204(2) are sub-intents to the first intent 206(1) included in the first intent level 204(1). Additionally, the fourth intent 206(4), the fifth intent 206(5), and the sixth intent 206(6) included in the third intent level 204(3) are sub-intents to the second intent 206(2) included in the second intent level 204(2) while the seventh intent 206(7) included in the third intent level 204(3) is a sub-intent to the third intent 206(3) included in the second intent level 204(2). Furthermore, the eighth intent 206(8) and the ninth intent 206(9) included in the fourth intent level 204(4) are sub-intents to the fifth intent level 204(5) included in the third intent level 204(3).

Referring back to the example of FIG. 1, the anchors 120 may include instances of text that are associated with the intents. As described herein, an instance of text may include, but is not limited to, a query, a request, a statement, a question, an answer, a number(s), and/or any other type of text. In some examples, the intent confidence data 114 may associate one or more (e.g., each) intents with a number of anchors. For example, a first intent may be associated with a first number of anchors 120, a second intent may be associated with a second number of anchors 120, a third intent may be associated with a third number of anchors 120, a fourth intent may be associated with a fourth number of anchors 120, and/or so forth. The number of anchors 120 may include, but is not limited to, one anchor 120, two anchors 120, five anchors 120, ten anchors 120, and/or any other number of anchors 120.

Figure 3:
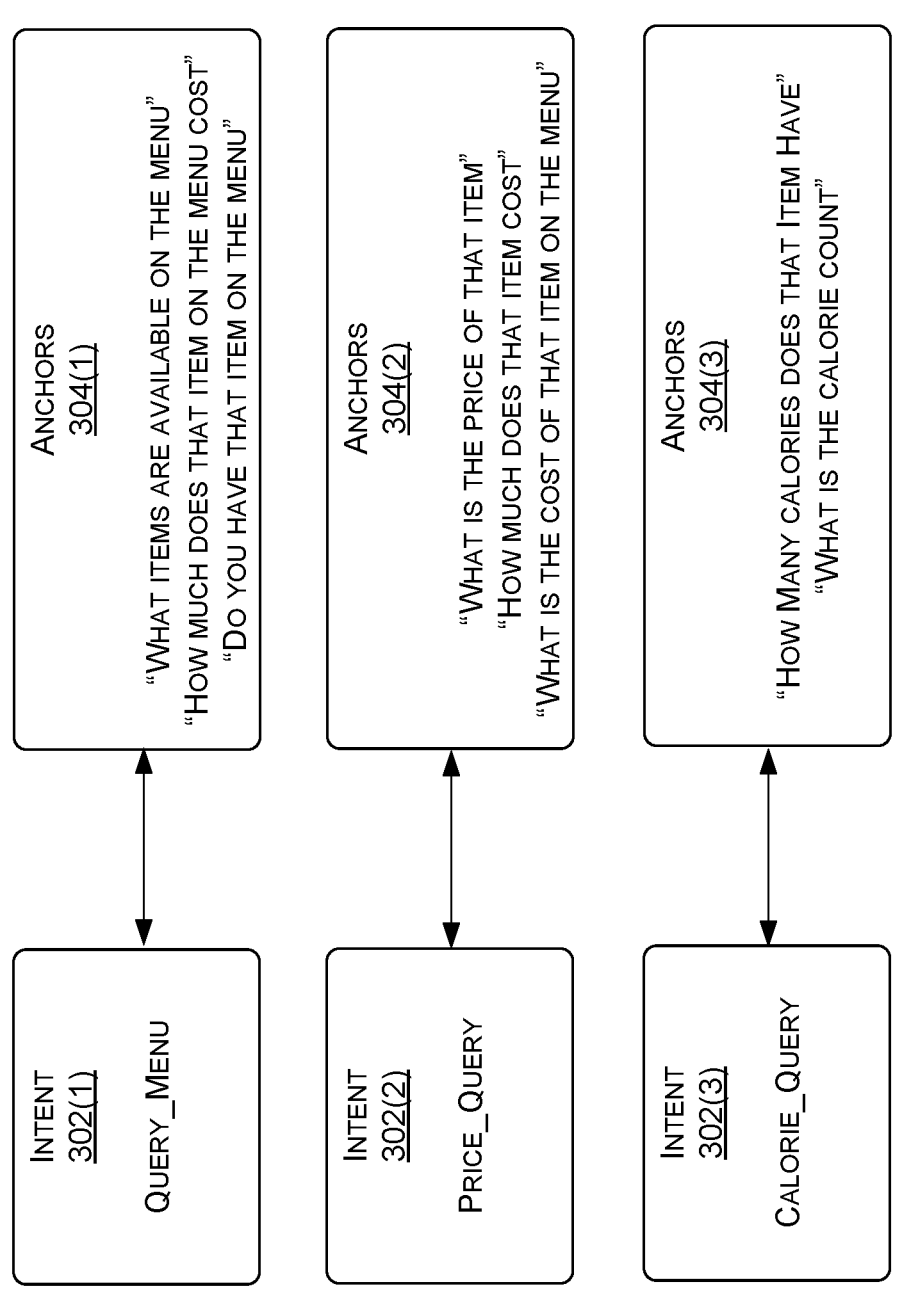
FIG. 3 illustrates an example of associating intents with anchors, in accordance with some embodiments of the present disclosure.

For instance, FIG. 3 illustrates an example of associating intents with anchors, in accordance with some embodiments of the present disclosure. As shown, a first intent 302(1), that includes "Query Menu" (e.g., querying a menu), is associated with anchors 304(1) that include "What items are available on the menu," "How much does that item on the menu cost," and "Do you have that item on the menu." A second intent 302(2), that includes "Price Menu" (e.g., querying a price), is associated with anchors 304(2) that include "What is the price of that item," "How much does that item cost," and "What is the cost of that item on the menu." Additionally, a third intent 302(3), that includes "Calorie Menu" (e.g., querying calories), is associated with anchors 304(3) that include "How many calories does that item have" and "What is the calorie count." In some examples, the first intent 302(1) may be included in a first intent level and the intents 302(2)-(3) may include sub-intents of the first intent 302(1). For example, the first intent 302(1) may represent the first intent 206(1), the second intent 302(2) may represent the second intent 206(2), and the third intent 302(3) may represent the third intent 206(3).

Referring back to the example of FIG. 1, the threshold scores 122 may include one or more threshold scores that are used to identify intents, which is described in more detail here. Additionally, the actions 124 may include different actions that may occur based on the selected intents. As described herein, an action may include, but is not limited to, enabling sub-intent classification (e.g., performing the processes described herein to identify a sub-intent), enabling sub-intent classification using a particular model(s) (e.g., the first model(s) 110, the second model(s) 116, etc.), providing a response (where the action may include the text of the response), fulfilling a request (e.g., booking a reservation, ordering an item, scheduling an event, etc.), and/or any other type of action.

The intent-identification component 108 may identify the portion of the intent confidence data 114 to input into the second model(s) 116 during a first instance of processing associated with the first intent represented by the intent data 112. In some examples, the intent-identification component 108 identifies the portion of the intent confidence data 114 as including an identifier(s) of the sub-intent(s) that is associated with the first intent (e.g., from the intent hierarchy 118), the anchor(s) 120 associated with the sub-intent(s), and/or the threshold score 122 associated with the first intent. The second model(s) 116 may then process the text data 106 and the portion of the intent confidence data 114 and, based on the processing, output data 126. As shown, the output data 126 includes at least intent data 128 representing one or more of the sub-intent(s) and confidence data 130 representing one or more confidence scores for the one or more of the sub-intent(s). For a first example, the intent data 128 may represent each of the sub-intent(s) and the confidence data 130 may represent a respective confidence score(s) associated with each of the sub-intent(s). For a second example, the intent data 128 may represent a sub-intent and the confidence data 130 may represent the confidence score for the sub-intent. In such an example, the sub-intent represented by the intent data 128 may include the sub-intent that is associated with the highest confidence score.

In some examples, the second model(s) 116 may determine a number of confidence scores for a sub-intent, where the number of confidence scores is associated with the number of anchors 120 for the sub-intent. For example, if the sub-intent is associated with three anchors 120, then the second model(s) 116 may output three confidence scores for the sub-intent, where each of the anchors 120 is associated with a respective confidence score. In some examples, the second model(s) 116 may determine a single confidence score for a sub-intent. For example, and again if the sub-intent is associated with three anchors 120, the second model(s) 116 may output the highest confidence score from among the confidence scores associated with the anchors 120.

As described herein, a confidence score associated with a sub-intent may indicate a likelihood that the sub-intent is associated with the text data 106 (e.g., the request represented by the text data 106). For example, and for a sub-intent, the second model(s) 116 may determine the confidence score(s) based on similarities between the text of the anchor(s) 120 associated with the sub-intent and the text represented by the text data 106. For instance, the greater the similarity between the text of an anchor 120 and the text represented by the text data 106, the greater the confidence score associated with the anchor 120 and/or the sub-intent. Additionally, the lesser the similarity between the text of the anchor 120 and the text represented by the text data 106, the lesser the confidence score associated with the anchor 120 and/or the sub-intent.

The intent-identification component 108 may then perform one or more processes based on the output data 126. For a first example, if the intent-identification component 108 determines that the confidence score(s) does not satisfy (e.g., is less than) the threshold score 122 associated with the first intent, then the intent-identification component 108 may determine to use the first intent as the final intent for the text data 106. However, if the intent-identification component 108 determines that a confidence score(s) satisfies (e.g., is equal to or greater than) the threshold score 122 associated with the first intent, then the intent-identification component 108 may determine to use the sub-intent associated with the confidence score(s) (and/or the sub-intent that is associated with the highest confidence score) as a second intent for the text data 106.

Figure 4A:
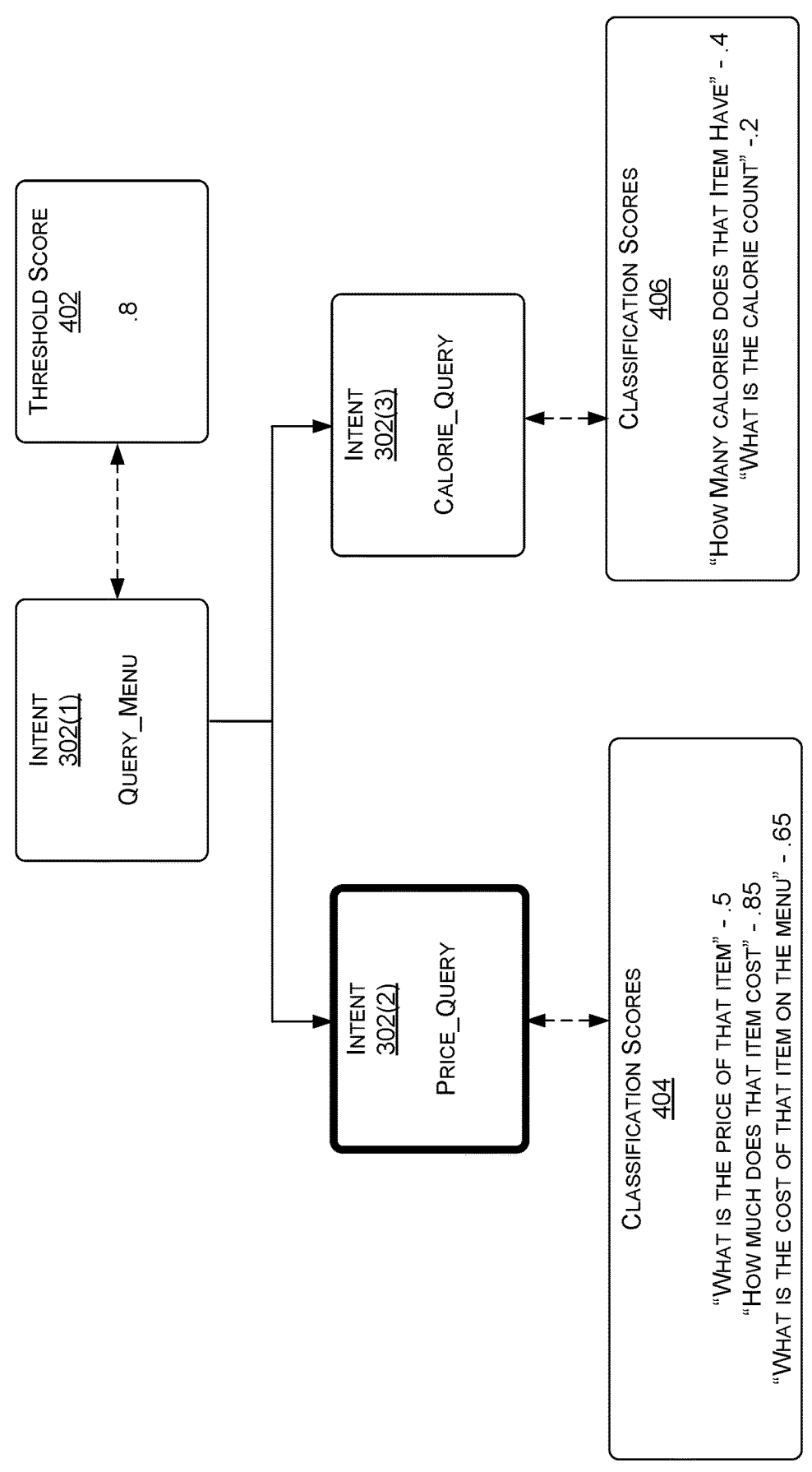
FIGS. 4A-4B illustrate examples of selecting intents using confidence scores, in accordance with some embodiments of the present disclosure.

For instance, FIG. 4A illustrates a first example of selecting an intent using confidence scores, in accordance with some embodiments of the present disclosure. As shown, the first intent 302(1) may be associated with a threshold score 402 (which may represent, and/or include, a threshold score 122) of 0.8. Additionally, the second anchors 304(2) associated with the second intent 302(2) may be associated with confidence scores 404 that include 0.5, 0.85, and 0.65. Furthermore, the third anchors 304(3) associated with the third intent 302(3) may be associated with confidence scores 406 that include 0.4 and 0.2. As such, the intent-identification component 108 may use the confidence scores 404 and the confidence scores 406 to select an intent associated with text data. For instance, and in the example of FIG. 4A, the intent-identification component 108 may determine that the confidence score 404 of 0.85 for the second intent 302(2) satisfies (e.g., is equal to or greater than) the threshold score 402 of 0.8. The intent-identification component 108 may also determine that all of the confidence scores 406 for the third intent 302(3) do not satisfy (e.g., are less than) the threshold score 402 of 0.8. As such, the intent-identification component 108 may determine to select the second intent 302(2) to associate with the text data, which is illustrated by the bolding of the box around the second intent 302(2).

Figure 4B:
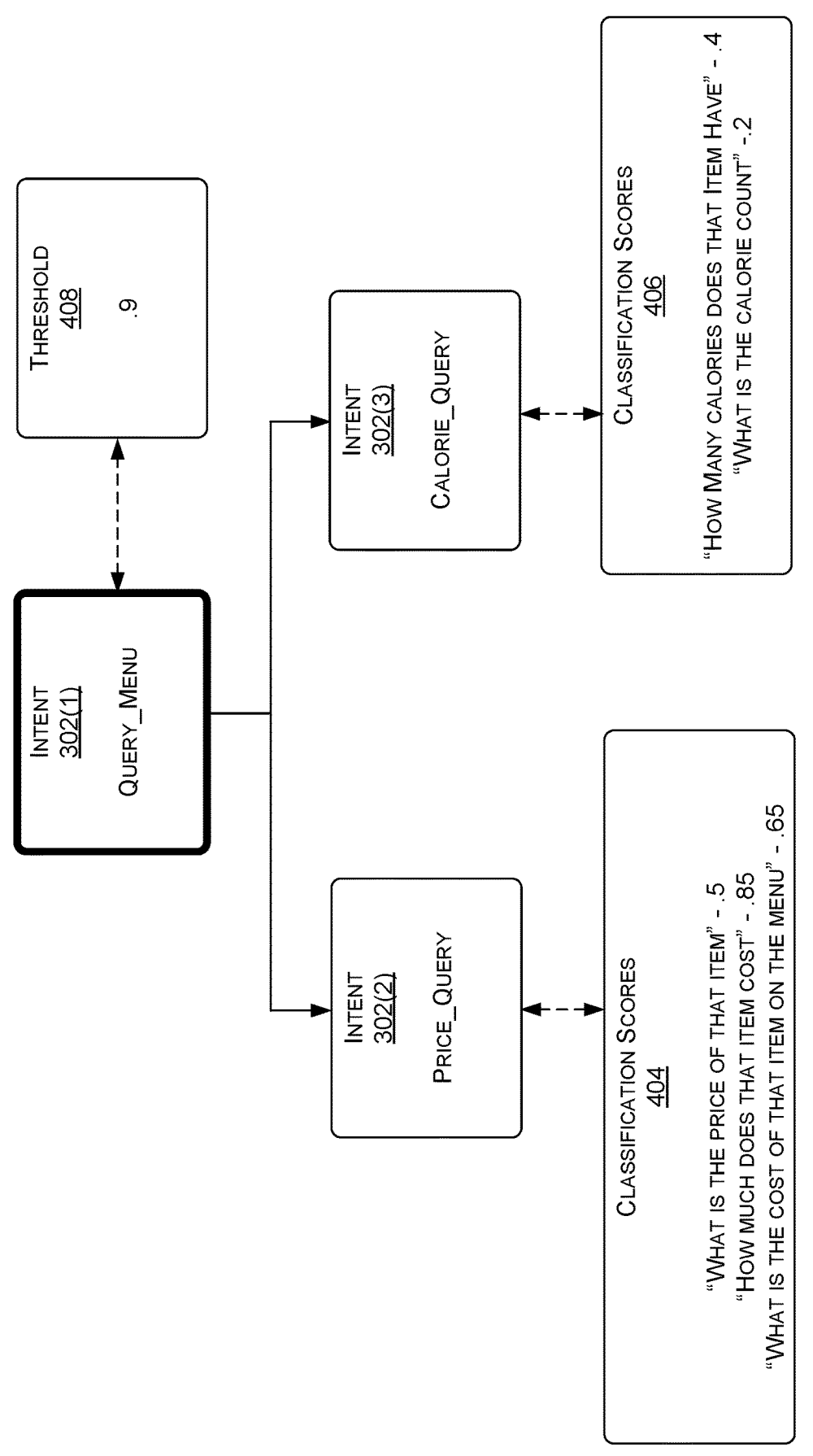

FIG. 4B illustrates a second example of selecting an intent using confidence scores, in accordance with some embodiments of the present disclosure. As shown, the first intent 302(1) may now be associated with a threshold score 408 (which may represent, and/or include, a threshold score 122) of 0.9. Additionally, the second anchors 304(2) associated with the second intent 302(2) may be associated with the confidence scores 404 that include 0.5, 0.85, and 0.65. Furthermore, the third anchors 304(3) associated with the third intent 302(3) may be associated with the confidence scores 406 that include 0.4 and 0.2. As such, the intent-identification component 108 may use the confidence scores 404 and the confidence scores 406 to select an intent associated with text data. For instance, and in the example of FIG. 4B, the intent-identification component 108 may now determine that all of the confidence scores 404 for the second intent 302(2) do not satisfy (e.g., are less than) the threshold score 408 of 0.9. The intent-identification component 108 may also determine that all of the confidence scores 406 for the third intent 302(3) do not satisfy (e.g., are less than) the threshold score 408 of 0.9. As such, the intent-identification component 108 may determine to select the first intent 302(1) to associate with the text data, which is illustrated by the bolding of the box around the first intent 302(1).

Referring back to the example of FIG. 1, the intent-identification component 108 may perform different processes based on whether the intent or a sub-intent is selected. For a first example, if the intent-identification component 108 selects the first intent (e.g., each of the confidence scores do not satisfy the threshold score 122), then the intent-identification component 108 may determine that the first intent is the final intent associated with the text data 106. For a second example, if the intent-identification component 108 selects a sub-intent to be the second intent (e.g., the confidence score for the sub-intent satisfies the threshold score 122), and the second intent is included in the last intent level in the intent hierarchy 118, then the intent-identification component 108 may determine that the second intent is the final intent associated with the text data 106. Still, for a third example, if the intent-identification component 108 again selects a sub-intent to be the second intent (e.g., the confidence score for the sub-intent satisfies the threshold score 122), but the second intent also includes one or more sub-intents (e.g., the second intent is not included in the last intent level of the intent hierarchy 118), then the intent-identification component 108 may perform these processes again using the one or more sub-intents associated with the second intent.

For instance, the intent-identification component 108 may again identify a portion of the intent confidence data 114 to input into the second model(s) 116 during a second instance of processing associated with the second intent represented by the intent data 128. In some examples, the intent-identification component 108 identifies the portion of the intent confidence data 114 as including an identifier(s) of the sub-intent(s) that is associated with the second intent (e.g., from the intent hierarchy 118), the anchor(s) 120 associated with the sub-intent(s), and/or the threshold score 122 associated with the second intent. The second model(s) 116 may then process the text data 106 and the portion of the intent confidence data 114 and, based on the processing, output second data 126. As shown, the second output data 126 includes at least second intent data 128 representing one or more of the sub-intent(s) and confidence data 130 representing one or more confidence scores for the one or more of the sub-intent(s).

The intent-identification component 108 may then perform one or more processes based on the second output data 126. For a first example, if the intent-identification component 108 determines that the confidence score(s) does not satisfy (e.g., is less than) the threshold score 122 associated with the second intent, then the intent-identification component 108 may determine to use the second intent as the final intent associated with the text data 106. However, if the intent-identification component 108 determines that a confidence score(s) satisfies (e.g., is equal to or greater than) the threshold score 122 associated with the second intent, then the intent-identification component 108 may determine to use the sub-intent associated with the confidence score(s) (and/or the sub-intent that is associated with the highest confidence score) to include a third intent associated with the text data 106.

The intent-identification component 108 may continue to perform these processes until one or more events occur. For a first example, the intent-identification component 108 may continue to perform these processes until the confidence score(s) for the sub-intent(s) does not satisfy the threshold score 122 for the currently selected intent. In such an example, the intent-identification component 108 may determine that intent is the final intent to associate with the text data 106. For a second example, the intent-identification component 108 may continue to perform these processes until an intent associated with the last intent level of the intent hierarchy 118 is selected. In such an example, the intent-identification component 108 may determine that intent is the final intent to associate with the text data 106.

The process 100 may include a dialogue manager 132 that uses at least the intent data 128 representing the final intent and the text data 106 to generate response data 134, representing a response, for the text data 106. In some examples, such as when the dialogue manger 132 is part of the intent-identification component 108, the dialogue manager 132 may use the action(s) 124 associated with the final intent to generate the response. For example, and as discussed herein, the action(s) 124 associated with the final intent may include at least a portion of the text for generating the response. As such, the dialogue manager 132 may process the text data 106 and the intent data 128 to determine which information to retrieve, such as based on one or more slots associated with the final intent. The dialogue manager 132 may then retrieve the information, such as from a knowledge database(s), and generate the response using the text from the action 124 and the retrieved information.

Figure 5:
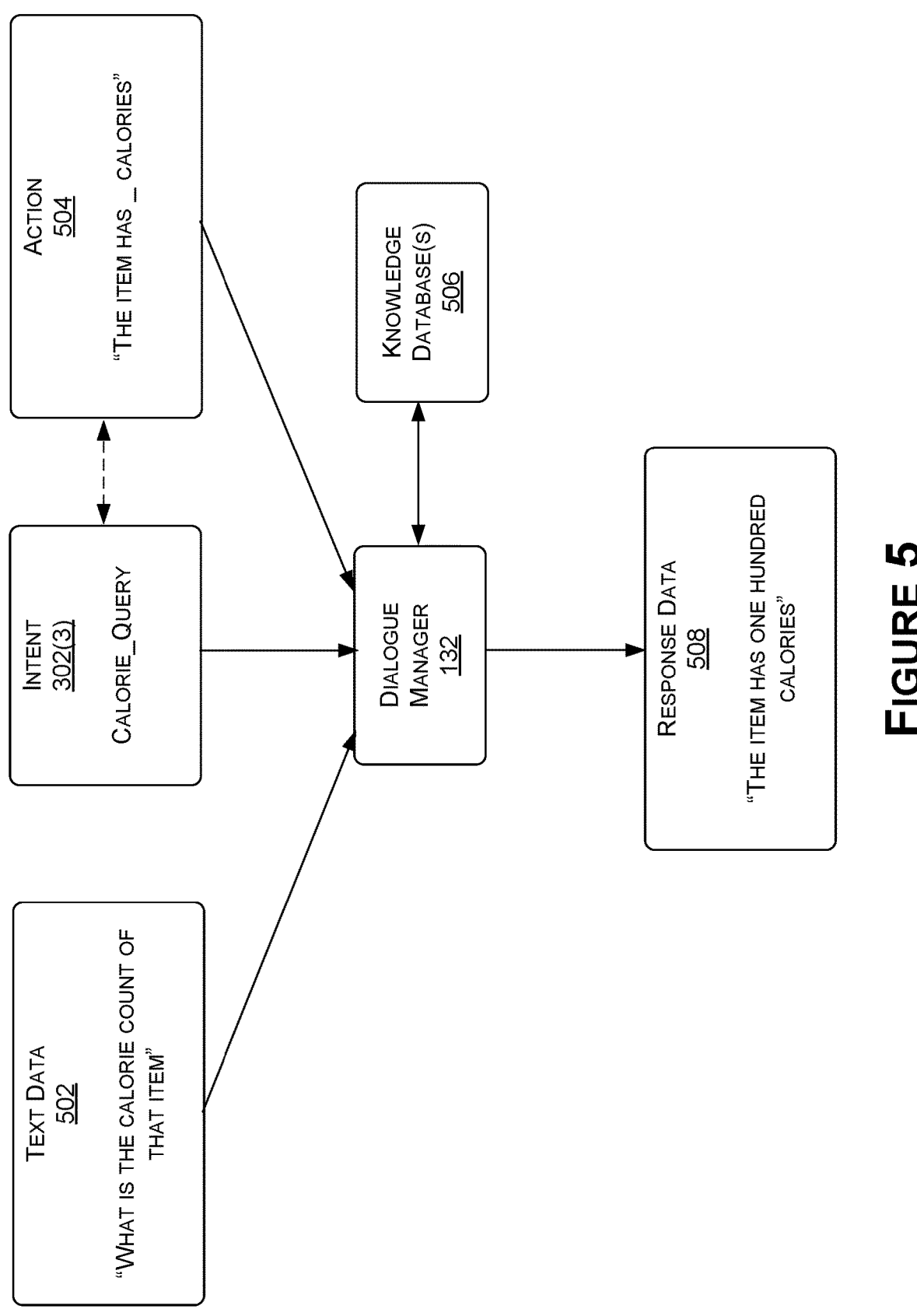
FIG. 5 illustrates an example of generating a response associated with a request, in accordance with some embodiments of the present disclosure.

For instance, FIG. 5 illustrates an example of generating a response associated with a request, in accordance with some embodiments of the present disclosure. As shown, the intent-identification component 108 may have determined that the third intent 302(3) includes the final intent for text data 502 (which may represent, and/or include, the text data 106). In the example of FIG. 5, the text data 502 represents a request that includes "What is the calorie count of that item." The third intent 302(3) may also be associated with an action 504 (which may represent, and/or include, an action 124) that includes text associated with a response, where the text includes "The item has_calories." As such, the dialogue manager 132 may determine that information associated with a slot for the third intent 302(3) includes the number of calories that are associated with the item. The dialogue manager 132 may then analyze a knowledge database(s) 506, which may include information associated with the menu items, to determine that the item includes one hundred calories. Additionally, the dialogue manager 132 may generate the response to include "The item has one hundred calories," where the response is represented by response data 508 (which may represent, and/or include, the response data 134).

Referring back to the example of FIG. 1, in some examples, the dialogue manager 132 may not use the actions 124 when generating the response. Rather, the dialogue manger 132 may include a model(s) that is able to process the text data 106 and the intent data 128 to generate the response data 134 representing the response. Additionally, the process 100 may include outputting (e.g., sending) the response data 134 to a user device(s) 136. In some examples, the user device(s) 136 also provided the input data 104 and/or input from the user device(s) 136 was used to generate the intent confidence data 114.

Figure 6:
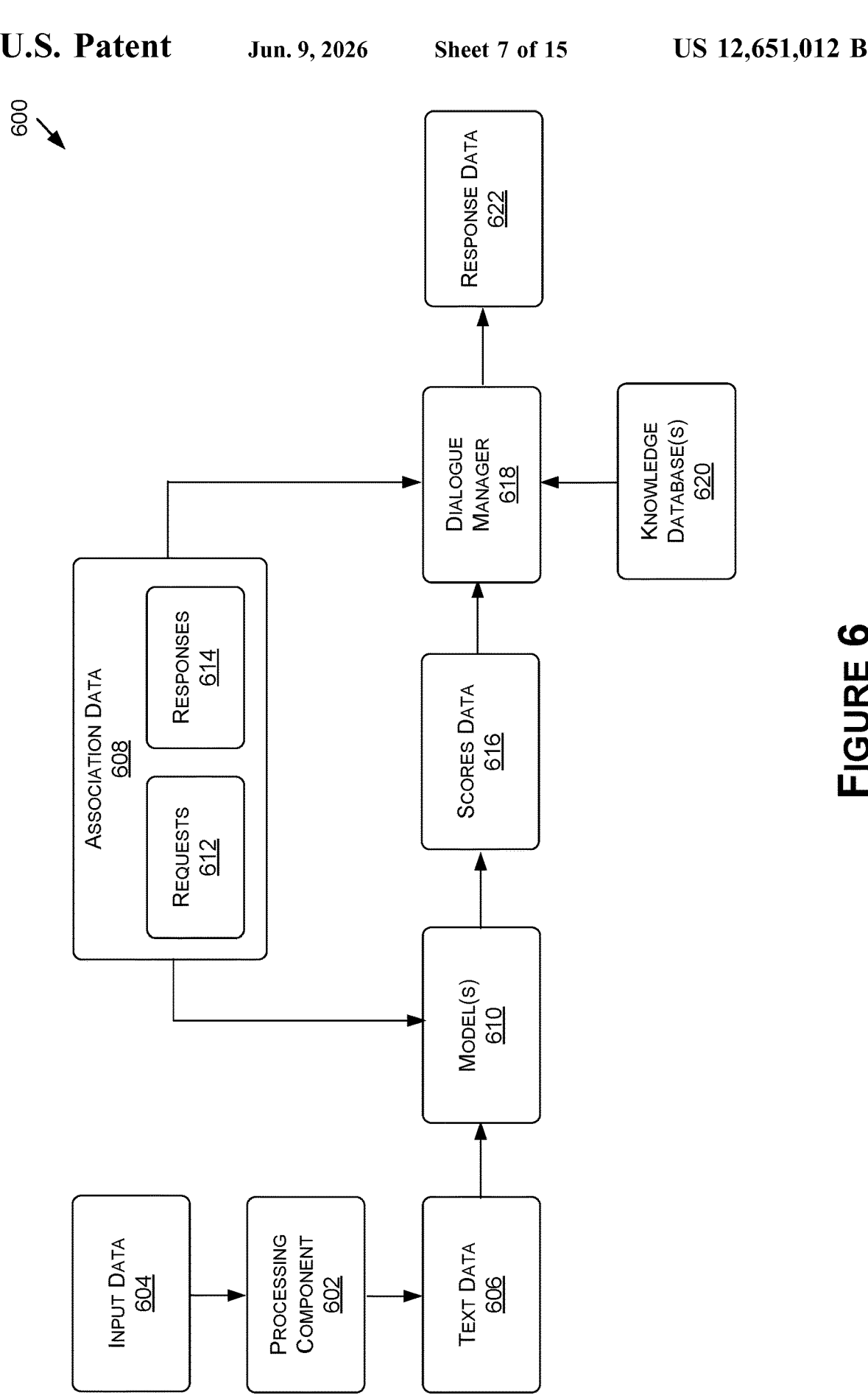
FIG. 6 illustrates an example data flow diagram for a process of using a machine learning model(s) and request/response pairs to determine a response to a request, in accordance with some embodiments of the present disclosure.

FIG. 6 illustrates an example data flow diagram for a process 600 of using a machine learning model(s) and request/response pairs to determine a response to a request, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The process 600 may include a processing component 602 receiving input data 604, such as from a user device. In some examples, the input data 604 may include audio data generated (e.g., using a microphone(s)) and/or sent by the user device, where the audio data represents user speech from one or more users. Additionally, or alternatively, in some examples, the input data 604 may include text data generated (e.g., using a keyboard, touchscreen, and/or other input device) and/or sent by the user device, where the text data represents one or more letters, words, numbers, and/or symbols. While these are just a couple example types of data that the input data 604 may include, in other examples, the input data 604 may include any other type of data (e.g., image data, video data, sensor data, etc.).

The process 600 may include the processing component 602 processing the input data 604 in order to generate text data 606. For a first example, such as when the input data 604 includes audio data representing user speech, the processing component 602 may include one or more speech-processing models, such as an ASR model(s), a STT model(s), an NLP model(s), a diarization model(s), and/or the like, that is configured to generate the text data 606 associated with the audio data. For instance, the text data 606 may represent a transcript (e.g., one or more letters, words, symbols, numbers, etc.) associated with the user speech. For a second example, such as when the input data 604 includes text data, the process 600 may not include the processing component 602 such that the text data 606 includes the input data 604 and/or the processing component 602 may process the text represented by the input data 604 in order to convert the text into a format associated with the text data 606.

The process 600 may include inputting the text data 606 and association data 608 into a model(s) 610 for processing (e.g., using one or more machine learning models). As described herein, the association data 608 may associate (e.g., group) requests 612 with responses 614. In some examples, the association data 608 may associate a single request 612 with a single response 614. In some examples, the association data 608 may associate a single request 612 with multiple responses 614. In some examples, the association data 608 may associate multiple requests 612 with a single response 614. In some examples, the association data 608 may associate multiple requests 612 with multiple responses 614. Still, in some examples, the requests 612 may include questions and the responses 614 may include answers to the questions or context associated with the questions, which is described in more detail herein.

Figure 7:
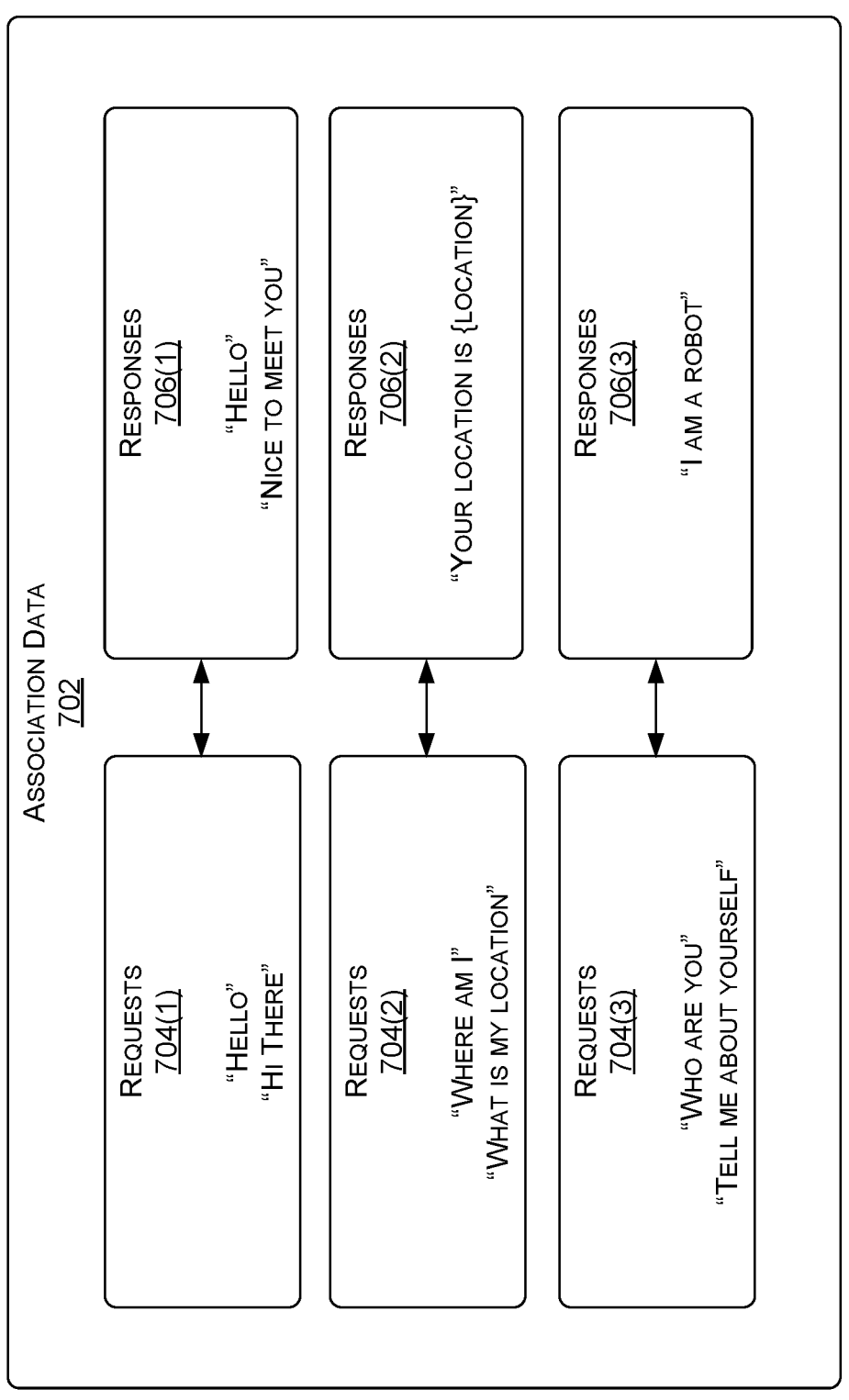
FIG. 7 illustrates an example of associating requests with responses, in accordance with some embodiments of the present disclosure.

For instance, FIG. 7 illustrates an example of associating requests with responses, in accordance with some embodiments of the present disclosure. As shown, association data 702 (which may represent, and/or include, the association data 608) may associate first requests 704(1) with first responses 706(1), second requests 704(2) with second responses 706(2), and third requests 704(3) with third responses 706(3). As further shown, the responses 706(1)-(3) may include different types of responses.

For instance, the responses 706(1) include answers to the questions that are associated with the requests 704(1). For example, and as described in more detail herein, if a question such as "Hello" or "Hi there" is asked, then the answers "Hello" or "Nice to meet you" may be provided. The response 706(2) may include a portion of an answer to the questions that are associated with the requests 704(2). For example, and as described in more detail herein, if a question such as "Where am I" or "What is my location" is asked, then an answer may be generated using the text "Your location is" and additional information from a knowledge database(s). The response 706(3) may include context to the questions that are associated with the requests 704(3). For example, and as described in more detail here, if a question such as "Who are you" or "Tell me about yourself" is asked, then an answer may be generated that includes the context "I am a robot."

Referring back to the example of FIG. 6, the process 600 may include the model(s) 610 processing the text data 606 and the association data 608 and, based on the processing, outputting scores data 616 representing confidence scores for the requests 612. In some examples, the model(s) 610 may output a respective confidence score for each of the requests 612. In some examples, the model(s) 610 may output a respective confidence score for only a portion of the requests 612. Still, in some examples, the model(s) 610 may output more than one confidence score for a request 612. As described herein, a confidence score associated with a request 612 may indicate an amount of similarity between the request 612 and the text represented by the text data 606. For instance, the greater the similarity between the text of a request 612 and the text represented by the text data 606, the greater the confidence score associated with the request 612. Additionally, the lesser the similarity between the text of the request 612 and the text represented by the text data 606, the lesser the confidence score associated with the request 612.

Figure 8:
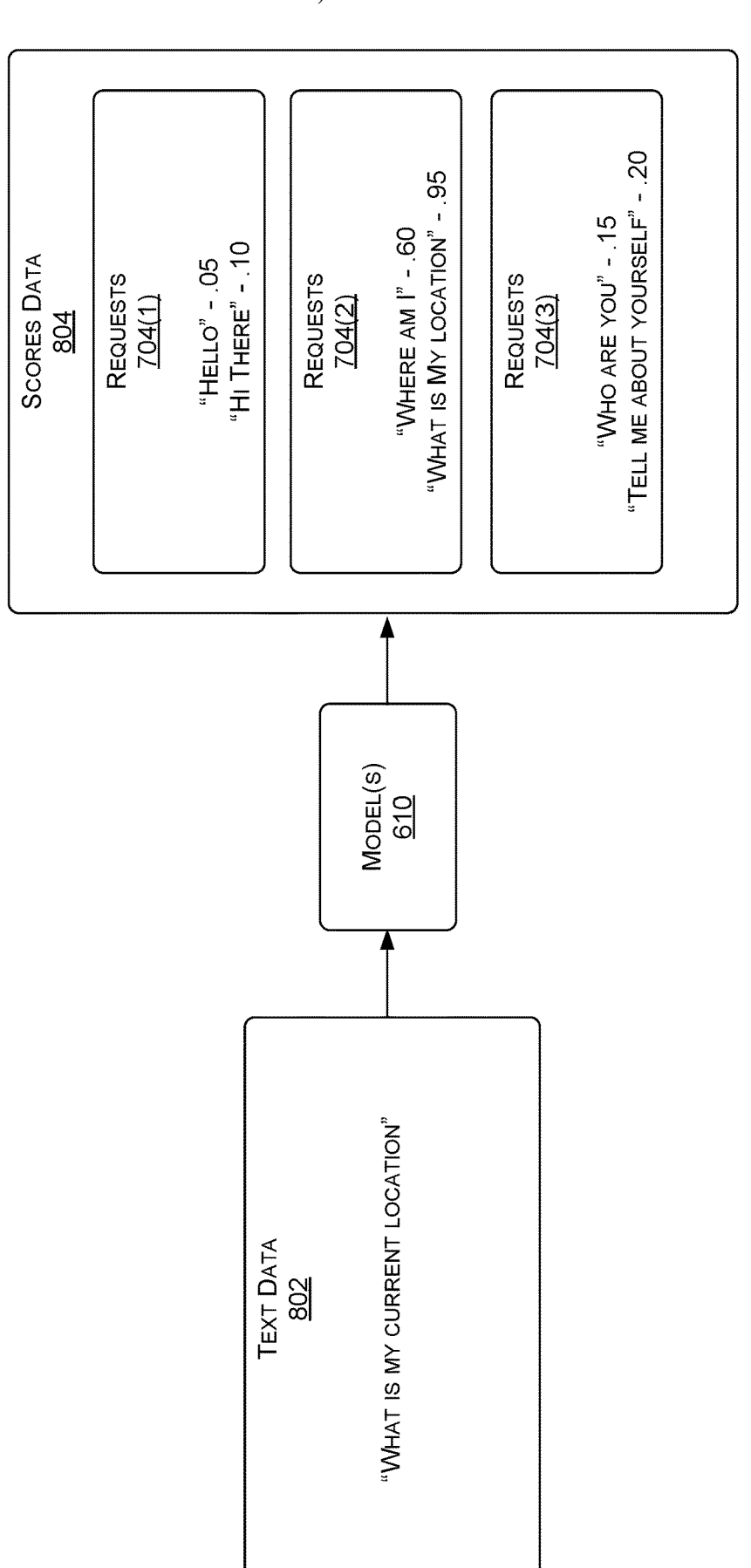
FIG. 8 illustrates an example of determining confidence scores associated with requests, in accordance with some embodiments of the present disclosure.

For instance, FIG. 8 illustrates an example of determining confidence scores associated with requests, in accordance with some embodiments of the present disclosure. As shown, the model(s) 610 may process text data 802 (which may represent, and/or include, the text data 606) that includes a question "What is my current location." Based on the processing, the model(s) 610 may output scores data 804 (which may represent, and/or include, the scores data 616) associated with the text data 802. For instance, the scores data 804 may include a first confidence score of 0.05 for the request "Hello", a second confidence score of 0.10 for the request "Hi there", a third confidence score of 0.60 for the request "Where am I", a fourth confidence score of 0.95 for the request "What is my location", a fifth confidence score of 0.15 for the request "Who are you", and a sixth confidence score of 0.20 for the request "Tell me about yourself". While the range of the confidence scores in the example of FIG. 8 is between 0 and 1, in other examples, the confidence scores may include any other range.

Referring back to the example of FIG. 1, the process 100 may include a dialogue manager 618 processing at least the scores data 616, the association data 608, and/or a knowledge database(s) 620 in order to generate response data 622 associated with the text data 606. For instance, the dialogue manager 618 may initially use the scores data 616 to identify a request 612. In some examples, the dialogue manager 618 identifies the request 612 that is associated with the highest confidence score. Additionally, or alternatively, in some examples, the dialogue manager 618 identifies the request 612 that is associated with a confidence score that satisfies (e.g., is equal to or greater than) a threshold score (e.g., 0.9). The dialogue manager 618 may then use the association data 608 to identify a response(s) 614 that is associated with the identified request 612. Additionally, the dialogue manager 618 may use the identified response(s) 614 to generate the response data 622.

For instance, if the dialogue manager 618 only identifies a single response 614 associated with the identified request 612, then the dialogue manager 618 may use that response 614 to generate the response data 622. However, if the dialogue manager 618 identifies multiple responses 614 that are associated with the identified request 612, then the dialogue manager 618 may select one of the responses 614 to generate the response data 622. In some examples, the dialogue manager 618 may randomly select one of the responses 614 while, in other examples, the dialogue manager 618 may use one or more criteria for selecting one of the responses 614. The one or more criteria may include, but are not limited to, not selecting the same response 614 consecutively for the same request 612, not selecting the same response 614 during a given time interval (e.g., an hour, a day, a week, etc.), not selecting the same response 614 for the same user, and/or any other criteria.

The dialogue manager 618 may then generate the response data 622 based on the type of response 614 selected. For a first example, if the response 614 includes an answer, then the dialogue manager 618 may generate the response data 622 to represent the answer. For a second example, if the response 614 includes context, then the dialogue manager 618 may generate the response data 622 to represent the context. Still, for a third example, if the response 614 includes text that requires additional information, then the dialogue manager 618 may identify the information using the knowledge database(s) 620. The dialogue manager 618 may then generate the response data 622 to represent a response that includes the text and the additional information. While these are just a couple example techniques of how the dialogue manager 618 may generate the response data 622, in other examples, the dialogue manager 618 may generate the response data 622 using additional and/or alternative techniques.

Figure 9:
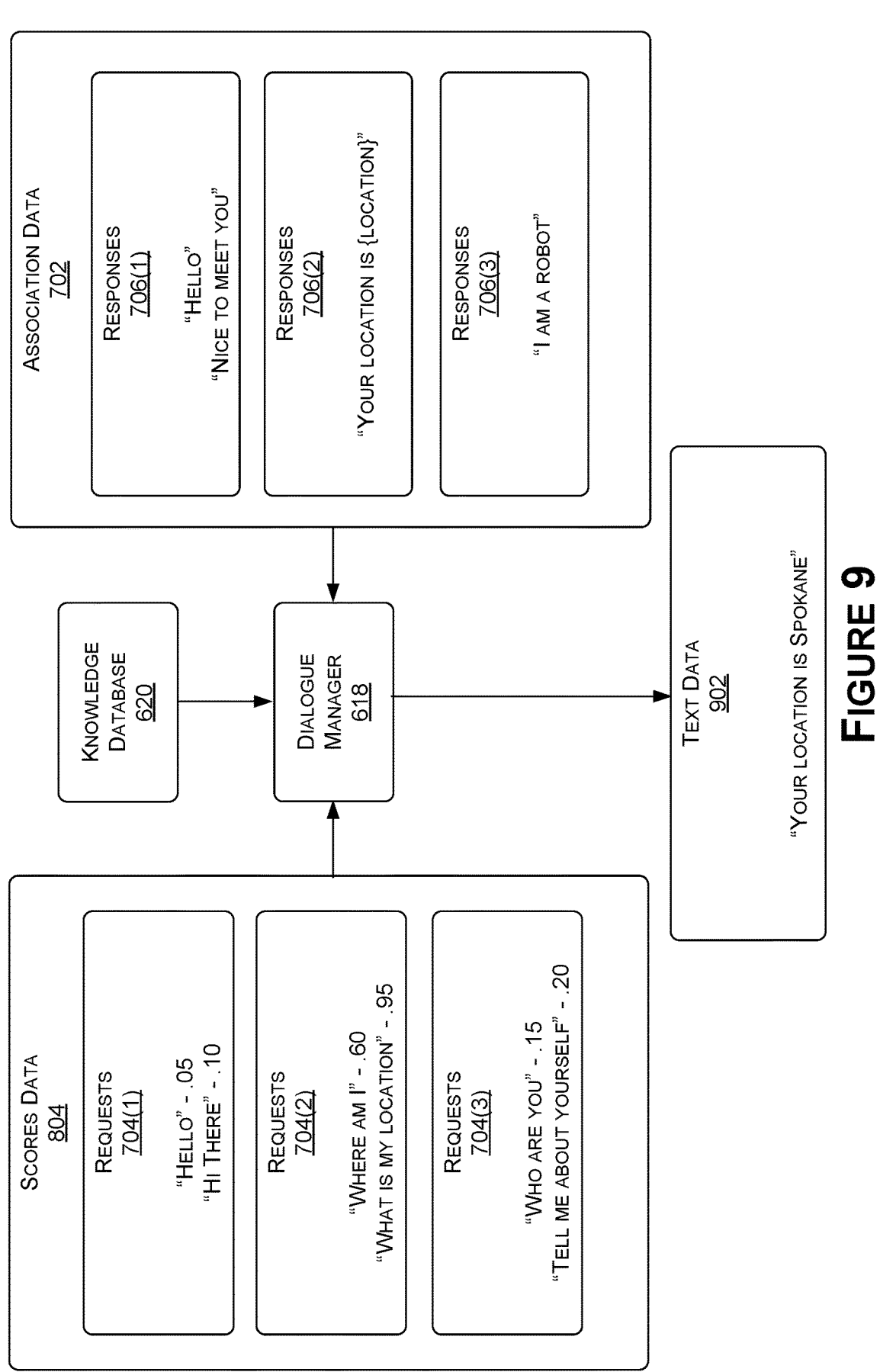
FIG. 9 illustrates an example of generating a response associated with a request, in accordance with some embodiments of the present disclosure.

For instance, FIG. 9 illustrates an example of generating a response associated with a request, in accordance with some embodiments of the present disclosure. In the example of FIG. 9, the dialogue manager 618 may initially use the scores data 804 to identify the request "What is my location". In some examples, the dialogue manager 618 identifies that request based on the request including the highest confidence score. In some examples, the dialogue manager 618 identifies that request based on the confidence score for the request satisfying the threshold score. In any example, the dialogue manager 618 may then use the association data 702 to determine that the request is associated with the response "Your location is {location}." As such, the dialogue manager 618 may determine that additional information is needed to generate a response.

In some examples, the dialogue manager 618 may then use the knowledge database(s) 620 to determine the location associated with the user that provided the request, which includes "Spokane" in the example of FIG. 9. Additionally, the dialogue manager 618 may generate the response using the text "Your location is" and the identified location of "Spokane." For instance, and as shown, response data 902 (which may represent, and/or include, the response data 622) represents the response "Your location is Spokane."

Referring back to the example of FIG. 6, while the example of FIG. 6 illustrates the model(s) 610 as being separate from the dialogue manager 618, in some examples, the dialogue manager 618 may include the model(s) 610. For instance, the dialogue manager 618 may additionally perform at least some of the processes of the model(s) 610. Additionally, while the example of FIG. 6 describes the dialogue manager 618 as using the scores data 616 to determine the response 614 to use for generating the response data 622, in other examples, the model(s) 610 may determine the response 614. For instance, in addition to, or alternatively from, outputting the scores data 616, the model(s) 610 may output data representing the response 614.

Furthermore, while the example of FIG. 1 and the example of FIG. 6 illustrate the process 100 as being separate from the process 600, in other examples, the process 600 may be combined with the process 100. For example, actions 124 associated with at least one intent from the process 100 may include the association data 608. In such an example, after the final intent is identified for the text data 106, the association data 608 associated with the final intent may be used to generate the response data 134 for the text data 106, using at least some of the process 600.

Figure 11:
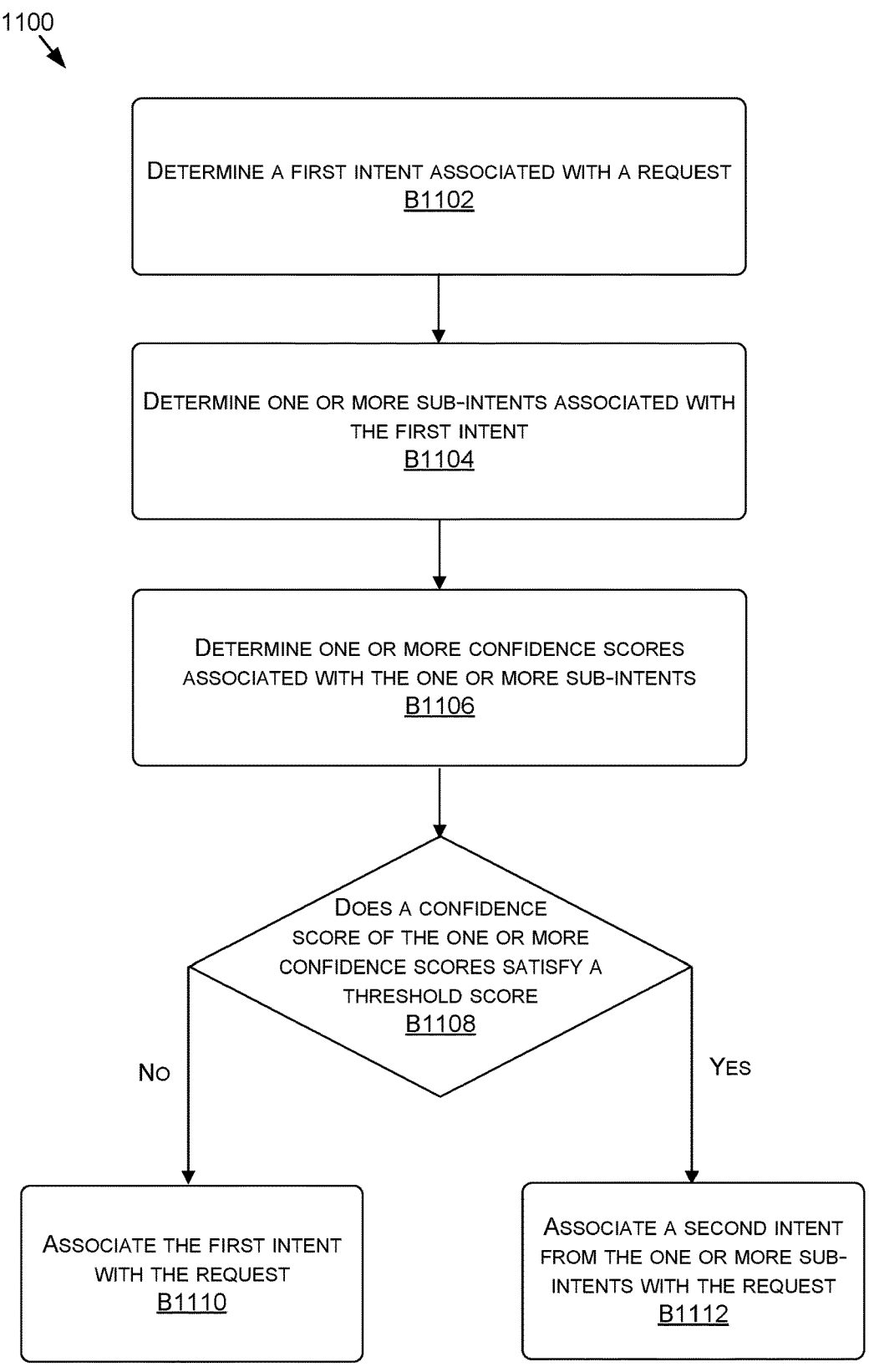
FIG. 11 is a flow diagram showing a method for determining an intent associated with a request, in accordance with some embodiments of the present disclosure.

Now referring to FIGS. 10-12, each block of methods 1000, 1100, and 1200, described herein, comprises a computing process that may be performed using any combination of hardware, firmware, and/or software. For instance, various functions may be carried out by a processor executing instructions stored in memory. The methods 1000, 1100, and 1200 may also be embodied as computer-usable instructions stored on computer storage media. The methods 1000, 1100, and 1200 may be provided by a standalone application, a service or hosted service (standalone or in combination with another hosted service), or a plug-in to another product, to name a few. In addition, the methods 1000, 1100, and 1200 are described, by way of example, with respect to FIGS. 1 and 6. However, the methods 1000, 1100, and 1200 may additionally or alternatively be executed by any one system, or any combination of systems, including, but not limited to, those described herein.

FIG. 10 is a flow diagram showing a method 1000 for generating a response to a request, in accordance with some embodiments of the present disclosure. The method 1000, at block B1002, may include determining, using one or more machine learning models and based at least on text data representing a request, a first intent associated with the request. For instance, the intent-identification component 108 may input the text data 106 into the first model(s) 110.

The first model(s) 110 may process the text data 106 and, based on the processing, output intent data 112 representing the first intent.

The method 1000, at block B1004, may include determining, using the one or more machine learning models and based at least on the text data and data associated with one or more second intents that are related to the first intent, a second intent of the one or more second intents that is associated with the request. For instance, the intent-identification component 108 may identify a portion of the intent confidence data 114, where the portion of the intent confidence data 114 includes an identifier(s) of the second intent(s), the anchor(s) 120 associated with the second intent(s), and/or the threshold score 122 associated with the first intent. The intent-identification component 108 may then input the text data 106 and the portion of the intent confidence data 114 into the second model(s) 116 (and/or the first model(s) 110 in some examples). The second model(s) 116 may process the text data 106 and the portion of the intent confidence data 114 and, based on the processing, output intent data 128 representing the second intent.

The method 1000, at block B1006, may include outputting, based at least on the second intent, a response to the request. For instance, the dialogue manager 132 may use at least the text data 106 and the intent data 128 to generate the response data 134 representing the response. In some examples, the response data 134 may be sent to a user device that provided the input data 104 associated with the text data 106.

FIG. 11 is a flow diagram showing a method 1100 for determining an intent associated with a request, in accordance with some embodiments of the present disclosure. The method 1100, at block B1102, may include determining a first intent associated with a request. For instance, the intent-identification component 108 may input the text data 106 into the first model(s) 110, where the intent data 112 represents the request. The first model(s) 110 may process the text data 106 and, based on the processing, output intent data 112 representing the first intent.

The method 1100, at block B1104, may include determining one or more sub-intents associated with the first intent. For instance, the intent-identification component 108 may analyze the intent confidence data 114 in order to determine the sub-intent(s) associated with the first intent. For example, the intent-identification component 108 may identify the sub-intent(s) based on the intent hierarchy 118, where the intent hierarchy 118 indicates the sub-intent(s) associated with the first intent.

The method 1100, at block B1106, may include determining one or more confidence scores associated with the one or more sub-intents. For instance, the intent-identification component 108 may retrieve a portion of the intent confidence data 114 that is associated with the sub-intent(s). As described herein, the portion of the intent confidence data 114 may include an identifier(s) of the sub-intent(s), the anchor(s) 120 associated with the sub-intent(s), and/or the threshold score 122 associated with the first intent. The intent-identification component 108 may then input the text data 106 and the portion of the intent confidence data 114 into the second model(s) 116 (and/or the first model(s) 110 in some examples). The second model(s) 116 may process the text data 106 and the portion of the intent confidence data 114 and, based on the processing, output the confidence data 130 representing the confidence score(s) for the sub-intent(s).

The method 1100, at block B1108, may include determining whether a confidence score of the one or more confidence scores satisfies a threshold score. For instance, the intent-identification component 108 may determine whether at least one of the confidence score(s) satisfies (e.g., is equal to or greater than) the threshold score 122. If, at block B1108, it is determined that the confidence score(s) does not satisfy the threshold score, then the method 1100, at block B1110, may include associating the first intent with the request. For instance, if the intent-identification component 108 determines that the confidence score(s) does not satisfy the threshold score 122, then the intent-identification component 108 may associate the first intent with the request.

However, if, at block B1108, it is determined that a confidence score of the confidence score(s) satisfies the threshold score, then the method 1100, at block B1112, may include associating a second intent from the one or more sub-intents with the request. For instance, if the intent-identification component 108 determines that the confidence score satisfies the threshold score 122, then the intent-identification component 108 may associate the second intent, from the sub-intent(s), that is associated with the confidence score with the request.

FIG. 12 is a flow diagram showing a method 1200 for using request/response pairs to determine a response to a request, in accordance with some embodiments of the present disclosure. The process 1200, at block B1202, may include determining, using one or more machine learning models and based at least on text data representing a first request and data that associates second requests with responses, confidence scores associated with the second requests. For instance, the text data 606 representing the first request and at least a portion of the association data 608 may be input into the model(s) 610. The model(s) 610 may process the text data 606 and the at least the portion of the association data 608. Based on the processing, the model(s) 610 may output the scores data 616 representing the confidence scores for the second requests 612. As described herein, the confidence scores may indicate how similar the second requests 612 are to the first request represented by the text data 606.

The method 1200, at block B1204, may include determining, based at least on the confidence scores, that a second request of the second requests is related to the first request. For instance, the dialogue manager 618 (and/or the model(s) 610 in some examples) may analyze the confidence scores in order to determine that at least a second request 612 is related to the first request. In some examples, the dialogue manager 618 makes the determination based on the second request 612 being associated with the highest confidence score. Additionally, or alternatively, in some examples, the dialogue manager 618 makes the determination based on the confidence score for the second request satisfying a threshold score.

The method 1200, at block B1206, may include determining that the second request is associated with a response from the responses. For instance, the dialogue manager 618 (and/or the model(s) 610 in some examples) may use the association data 608 to determine that the second request 612 is associated with the response 614. In some examples, the dialogue manager 618 makes the determination based on the association data 608 pairing the second request 612 with the response 614. In some examples, such as when the second request 612 is associated with more than one response 614, the dialogue manager 618 may use one or more criteria, which are described herein, to select the response 614 from the responses 614.

The method 1200, at block B1208, may include outputting data associated with the response. For instance, the dialogue manager 618 may generate and then output the response data 622 associated with the response 614. In some examples, such as when the response 614 includes an answer, the response data 622 may represent the answer. In some examples, such as when the response 614 includes context, the response data 622 may represent the context. Still, in some examples, such as when the response includes text (e.g., a part of an answer) that requires additional information, then the dialogue manager 618 may identify the information, such as by using the knowledge database 620. The dialogue manager 618 may then generate a response using the text and the information, where the response data 622 represents the response.

Example Computing Device

Figure 13:
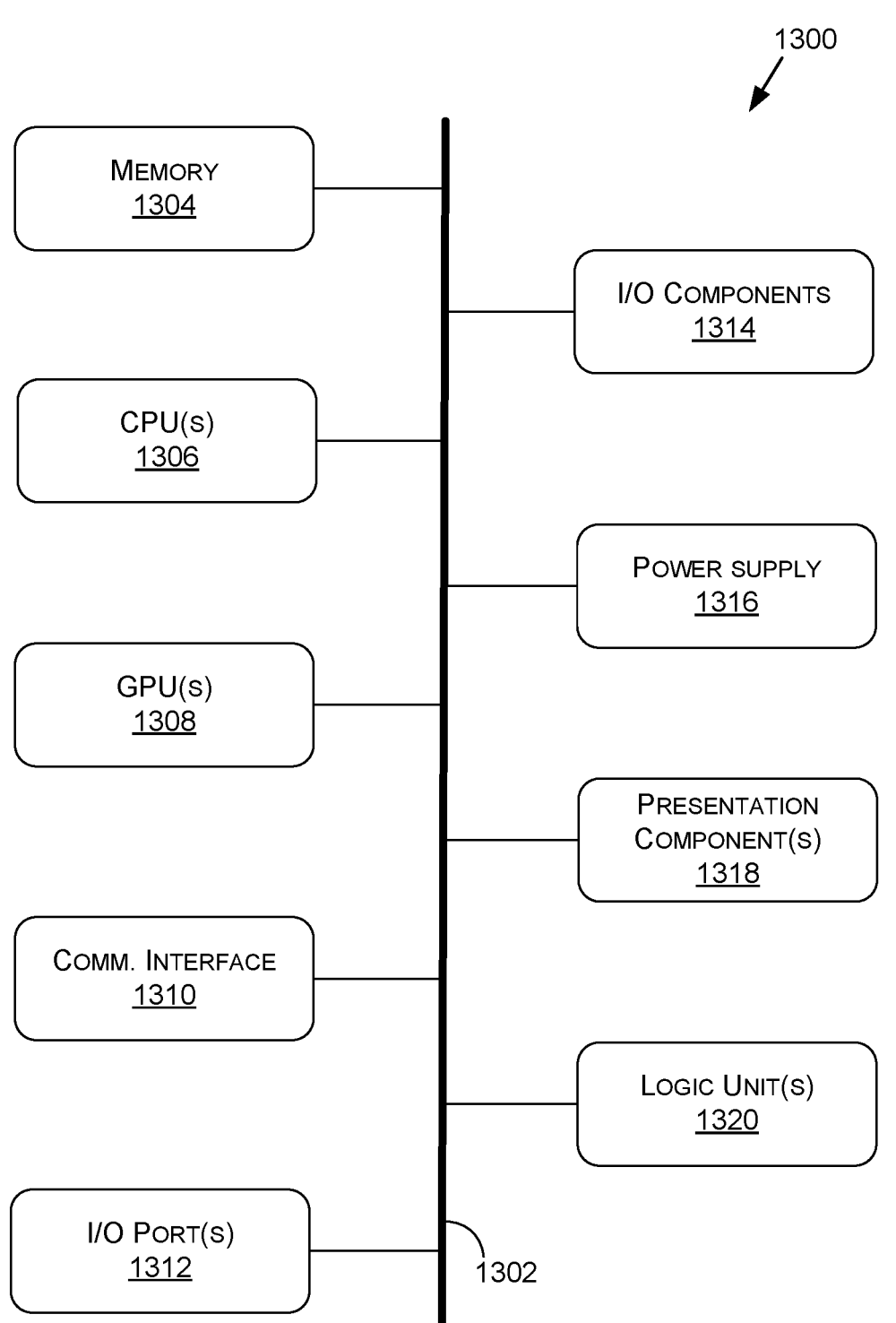
FIG. 13 is a block diagram of an example computing device suitable for use in implementing some embodiments of the present disclosure.

FIG. 13 is a block diagram of an example computing device(s) 1300 suitable for use in implementing some embodiments of the present disclosure. Computing device 1300 may include an interconnect system 1302 that directly or indirectly couples the following devices: memory 1304, one or more central processing units (CPUs) 1306, one or more graphics processing units (GPUs) 1308, a communication interface 1310, input/output (I/O) ports 1312, input/output components 1314, a power supply 1316, one or more presentation components 1318 (e.g., display(s)), and one or more logic units 1320. In at least one embodiment, the computing device(s) 1300 may comprise one or more virtual machines (VMs), and/or any of the components thereof may comprise virtual components (e.g., virtual hardware components). For non-limiting examples, one or more of the GPUs 1308 may comprise one or more vGPUs, one or more of the CPUs 1306 may comprise one or more vCPUs, and/or one or more of the logic units 1320 may comprise one or more virtual logic units. As such, a computing device(s) 1300 may include discrete components (e.g., a full GPU dedicated to the computing device 1300), virtual components (e.g., a portion of a GPU dedicated to the computing device 1300), or a combination thereof.

Although the various blocks of FIG. 13 are shown as connected via the interconnect system 1302 with lines, this is not intended to be limiting and is for clarity only. For example, in some embodiments, a presentation component 1318, such as a display device, may be considered an I/O component 1314 (e.g., if the display is a touch screen). As another example, the CPUs 1306 and/or GPUs 1308 may include memory (e.g., the memory 1304 may be representative of a storage device in addition to the memory of the GPUs 1308, the CPUs 1306, and/or other components). In other words, the computing device of FIG. 13 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 13.

The interconnect system 1302 may represent one or more links or busses, such as an address bus, a data bus, a control bus, or a combination thereof. The interconnect system 1302 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1306 may be directly connected to the memory 1304. Further, the CPU 1306 may be directly connected to the GPU 1308. Where there is direct, or point-to-point connection between components, the interconnect system 1302 may include a PCIe link to carry out the connection. In these examples, a PCI bus need not be included in the computing device 1300.

The memory 1304 may include any of a variety of computer-readable media. The computer-readable media may be any available media that may be accessed by the computing device 1300. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1304 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1300. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1306 may be configured to execute at least some of the computer-readable instructions to control one or more components of the computing device 1300 to perform one or more of the methods and/or processes described herein. The CPU(s) 1306 may each include one or more cores (e.g., one, two, four, eight, twenty-eight, seventy-two, etc.) that are capable of handling a multitude of software threads simultaneously. The CPU(s) 1306 may include any type of processor, and may include different types of processors depending on the type of computing device 1300 implemented (e.g., processors with fewer cores for mobile devices and processors with more cores for servers). For example, depending on the type of computing device 1300, the processor may be an Advanced RISC Machines (ARM) processor implemented using Reduced Instruction Set Computing (RISC) or an x86 processor implemented using Complex Instruction Set Computing (CISC). The computing device 1300 may include one or more CPUs 1306 in addition to one or more microprocessors or supplementary co-processors, such as math co-processors.

In addition to or alternatively from the CPU(s) 1306, the GPU(s) 1308 may be configured to execute at least some of the computer-readable instructions to control one or more components of the computing device 1300 to perform one or more of the methods and/or processes described herein. One or more of the GPU(s) 1308 may be an integrated GPU (e.g., with one or more of the CPU(s) 1306 and/or one or more of the GPU(s) 1308 may be a discrete GPU. In embodiments, one or more of the GPU(s) 1308 may be a coprocessor of one or more of the CPU(s) 1306. The GPU(s) 1308 may be used by the computing device 1300 to render graphics (e.g., 3D graphics) or perform general purpose computations. For example, the GPU(s) 1308 may be used for General-Purpose computing on GPUs (GPGPU). The GPU(s) 1308 may include hundreds or thousands of cores that are capable of handling hundreds or thousands of software threads simultaneously. The GPU(s) 1308 may generate pixel data for output images in response to rendering commands (e.g., rendering commands from the CPU(s) 1306 received via a host interface). The GPU(s) 1308 may include graphics memory, such as display memory, for storing pixel data or any other suitable data, such as GPGPU data. The display memory may be included as part of the memory 1304. The GPU(s) 1308 may include two or more GPUs operating in parallel (e.g., via a link). The link may directly connect the GPUs (e.g., using NVLINK) or may connect the GPUs through a switch (e.g., using NVSwitch). When combined together, each GPU 1308 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1306 and/or the GPU(s) 1308, the logic unit(s) 1320 may be configured to execute at least some of the computer-readable instructions to control one or more components of the computing device 1300 to perform one or more of the methods and/or processes described herein. In embodiments, the CPU(s) 1306, the GPU(s) 1308, and/or the logic unit(s) 1320 may discretely or jointly perform any combination of the methods, processes and/or portions thereof. One or more of the logic units 1320 may be part of and/or integrated in one or more of the CPU(s) 1306 and/or the GPU(s) 1308 and/or one or more of the logic units 1320 may be discrete components or otherwise external to the CPU(s) 1306 and/or the GPU(s) 1308. In embodiments, one or more of the logic units 1320 may be a coprocessor of one or more of the CPU(s) 1306 and/or one or more of the GPU(s) 1308.

Examples of the logic unit(s) 1320 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1310 may include one or more receivers, transmitters, and/or transceivers that enable the computing device 1300 to communicate with other computing devices via an electronic communication network, included wired and/or wireless communications. The communication interface 1310 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1320 and/or communication interface 1310 may include one or more data processing units (DPUs) to transmit data received over a network and/or through interconnect system 1302 directly to (e.g., a memory of) one or more GPU(s) 1308.

The I/O ports 1312 may enable the computing device 1300 to be logically coupled to other devices including the I/O components 1314, the presentation component(s) 1318, and/or other components, some of which may be built in to (e.g., integrated in) the computing device 1300. Illustrative I/O components 1314 include a microphone, mouse, keyboard, joystick, game pad, game controller, satellite dish, scanner, printer, wireless device, etc. The I/O components 1314 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1300. The computing device 1300 may be include depth cameras, such as stereoscopic camera systems, infrared camera systems, RGB camera systems, touchscreen technology, and combinations of these, for gesture detection and recognition. Additionally, the computing device 1300 may include accelerometers or gyroscopes (e.g., as part of an inertia measurement unit (IMU)) that enable detection of motion. In some examples, the output of the accelerometers or gyroscopes may be used by the computing device 1300 to render immersive augmented reality or virtual reality.

The power supply 1316 may include a hard-wired power supply, a battery power supply, or a combination thereof. The power supply 1316 may provide power to the computing device 1300 to enable the components of the computing device 1300 to operate.

The presentation component(s) 1318 may include a display (e.g., a monitor, a touch screen, a television screen, a heads-up-display (HUD), other display types, or a combination thereof), speakers, and/or other presentation components. The presentation component(s) 1318 may receive data from other components (e.g., the GPU(s) 1308, the CPU(s) 1306, DPUs, etc.), and output the data (e.g., as an image, video, sound, etc.).

Example Data Center

Figure 14:
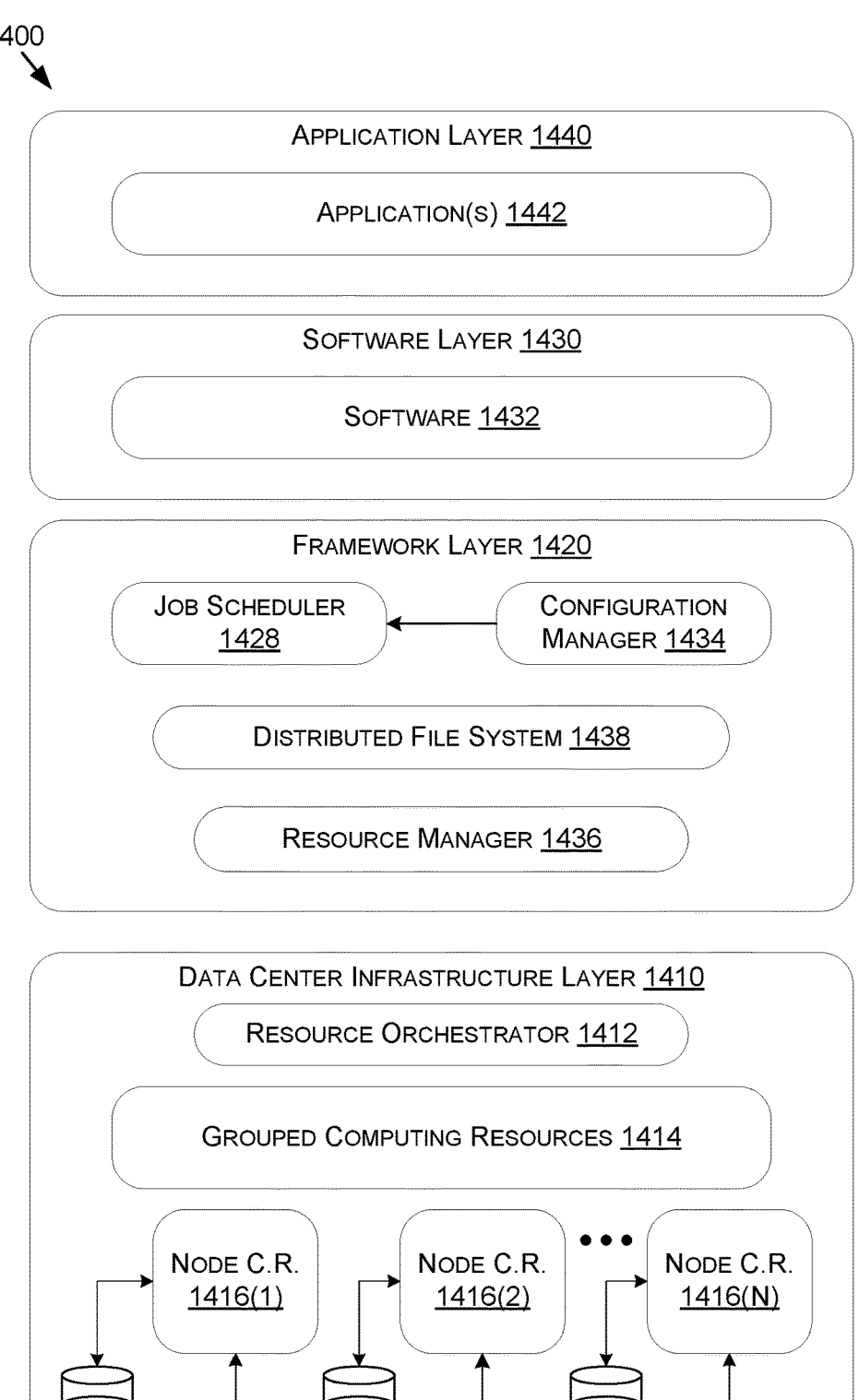
FIG. 14 is a block diagram of an example data center suitable for use in implementing some embodiments of the present disclosure.

FIG. 14 illustrates an example data center 1400 that may be used in at least one embodiments of the present disclosure. The data center 1400 may include a data center infrastructure layer 1410, a framework layer 1420, a software layer 1430, and/or an application layer 1440.

As shown in FIG. 14, the data center infrastructure layer 1410 may include a resource orchestrator 1412, grouped computing resources 1414, and node computing resources ("node C.R.s") 1416(1)-1416(N), where "N" represents any whole, positive integer. In at least one embodiment, node C.R.s 1416(1)-1416(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O)

devices, network switches, virtual machines (VMs), power modules, and/or cooling modules, etc. In some embodiments, one or more node C.R.s from among node C.R.s 1416(1)-1416(N) may correspond to a server having one or more of the above-mentioned computing resources. In addition, in some embodiments, the node C.R.s 1416(1)-14161 (N) may include one or more virtual components, such as vGPUs, vCPUs, and/or the like, and/or one or more of the node C.R.s 1416(1)-1416(N) may correspond to a virtual machine (VM).

In at least one embodiment, grouped computing resources 1414 may include separate groupings of node C.R.s 1416 housed within one or more racks (not shown), or many racks housed in data centers at various geographical locations (also not shown). Separate groupings of node C.R.s 1416 within grouped computing resources 1414 may include grouped compute, network, memory or storage resources that may be configured or allocated to support one or more workloads. In at least one embodiment, several node C.R.s 1416 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1412 may configure or otherwise control one or more node C.R.s 1416(1)-1416(N) and/or grouped computing resources 1414. In at least one embodiment, resource orchestrator 1412 may include a software design infrastructure (SDI) management entity for the data center 1400. The resource orchestrator 1412 may include hardware, software, or some combination thereof.

In at least one embodiment, as shown in FIG. 14, framework layer 1420 may include a job scheduler 1428, a configuration manager 1434, a resource manager 1436, and/or a distributed file system 1438. The framework layer 1420 may include a framework to support software 1432 of software layer 1430 and/or one or more application(s) 1442 of application layer 1440. The software 1432 or application(s) 1442 may respectively include web-based service software or applications, such as those provided by Amazon Web Services, Google Cloud and Microsoft Azure. The framework layer 1420 may be, but is not limited to, a type of free and open-source software web application framework such as Apache Spark™ (hereinafter "Spark") that may utilize distributed file system 1438 for large-scale data processing (e.g., "big data"). In at least one embodiment, job scheduler 1428 may include a Spark driver to facilitate scheduling of workloads supported by various layers of data center 1400. The configuration manager 1434 may be capable of configuring different layers such as software layer 1430 and framework layer 1420 including Spark and distributed file system 1438 for supporting large-scale data processing. The resource manager 1436 may be capable of managing clustered or grouped computing resources mapped to or allocated for support of distributed file system 1438 and job scheduler 1428. In at least one embodiment, clustered or grouped computing resources may include grouped computing resource 1414 at data center infrastructure layer 1410. The resource manager 1436 may coordinate with resource orchestrator 1412 to manage these mapped or allocated computing resources.

In at least one embodiment, software 1432 included in software layer 1430 may include software used by at least portions of node C.R.s 1416(1)-1416(N), grouped computing resources 1414, and/or distributed file system 1438 of framework layer 1420. One or more types of software may include, but are not limited to, Internet web page search software, e-mail virus scan software, database software, and streaming video content software.

In at least one embodiment, application(s) 1442 included in application layer 1440 may include one or more types of applications used by at least portions of node C.R.s 1416 (1)-1416(N), grouped computing resources 1414, and/or distributed file system 1438 of framework layer 1420. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1434, resource manager 1436, and resource orchestrator 1412 may implement any number and type of self-modifying actions based on any amount and type of data acquired in any technically feasible fashion. Self-modifying actions may relieve a data center operator of data center 1400 from making possibly bad configuration decisions and possibly avoiding underutilized and/or poor performing portions of a data center.

The data center 1400 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1400. In at least one embodiment, trained or deployed machine learning models corresponding to one or more neural networks may be used to infer or predict information using resources described above with respect to the data center 1400 by using weight parameters calculated through one or more training techniques, such as but not limited to those described herein.

In at least one embodiment, the data center 1400 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1300 of FIG. 13—e.g., each device may include similar components, features, and/or functionality of the computing device(s) 1300. In addition, where backend devices (e.g., servers, NAS, etc.) are implemented, the backend devices may be included as part of a data center 1400, an example of which is described in more detail herein with respect to FIG. 14.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1300 described herein with respect to FIG. 13. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, based at least on one or more machine learning models processing input data associated with a request, a first intent associated with the request, the one or more machine learning models trained to determine the first intent;

determining, using the first intent, that at least a portion of stored data represents one or more relationships between the first intent and one or more second intents which the one or more machine learning models are not trained to determine;

applying, to the one or more machine learning models, the input data and the at least the portion of the stored data;

determining, based at least on the one or more machine learning models processing the input data and the at least the portion of the stored data, a second intent of the one or more second intents that is associated with the request; and causing, based at least on the second intent, an output of response to the request.

2. The method of claim 1, wherein:

the determining the first intent associated with the request uses one or more first machine learning models of the one or more machine learning models; and the determining the second intent associated with the request uses one or more second machine learning models of the one or more machine learning models.

3. The method of claim 1, wherein:

the stored data is further representative of one or more second relationships between a third intent and one or more fourth intents; and the at least the portion of the stored data does not represent the one or more second relationships between the third intent and the one or more fourth intents.

4. The method of claim 3, wherein the determining the second intent that is associated with the request comprises:

determining, based at least on the one or more machine learning models processing the input data and the at least the portion of the stored data, a first confidence score associated with the second intent and a second confidence score associated with a third intent of the one or more second intents; and determining, based at least on the first confidence score being greater than the second confidence score, the second intent that is associated with the request.

5. The method of claim 1, wherein the stored data is representative of at least first text associated with the second intent and second text associated with the second intent.

6. The method of claim 5, wherein the determining the second intent that is associated with the request comprises:

determining, based at least on the one or more machine learning models processing the input data and the at least the portion of the stored data, a first confidence score associated with the first text and a second confidence score associated with the second text; and determining, based at least on at least one of the first confidence score or the second confidence score satisfying a threshold score, the second intent that is associated with the request.

7. The method of claim 1, further comprising:

determining, using the one or more machine learning models and based at least on the input data and additional data associated with one or more third intents related to the second intent, one or more confidence scores associated with the one or more third intents;

determining that the one or more confidence scores do not satisfy a threshold score; and determining, based at least on the one or more confidence scores not satisfying the threshold score, that the second intent includes a final intent associated with the request.

8. The method of claim 1, further comprising:

determining, using the one or more machine learning models and based at least on the input data and additional data associated with one or more third intents related to the second intent, one or more confidence scores associated with the one or more third intents;

determining that at least a confidence score of the one or more confidence scores satisfies a threshold score; and determining, based at least on the confidence score satisfying the threshold score, that a third intent of the one or more third intents includes a final intent associated with the request, wherein the causing the output of the response to the request is based at least on the third intent.

9. The method of claim 1, further comprising:

determining additional data associated with the first intent, the additional data corresponding to one or more of an action to perform a search for a new intent, one or more identifiers associated with the one or more second intents, or a confidence score associated with the first intent, wherein the determining the second intent is further based at least on the additional data.

10. The method of claim 1, further comprising:

determining an action associated with the second intent, the action including at least text for generating the response; and generating the response based at least on the text.

11. A system comprising:

one or more processors to:

store information indicating at least one or more first relationships between a first intent and one or more second intents and one or more second relationships between the one or more second intents and one or more third intents;

determine, based at least on one or more machine learning models processing first data associated with a request, a first intent associated with the request;

determine, based at least on the one or more machine learning models processing the first intent and second data representing a first portion of the information that indicates the one or more first relationships between the first intent and the one or more second intents, a second intent of the one or more second intents;

determine, based at least on the one or more machine learning models processing the first data and third data representing a second portion of the information that indicates the one or more second relationships between the one or more second intents and the one or more third intents, a third intent of the one or more third intents; and cause, based at least on the third intent, an output of a response to the request.

12. The system of claim 11, wherein the output of the response to the request is caused at least by:

determining, based at least on a confidence score associated with the third intent satisfying a threshold score, the response using the third intent; and causing the output of the response to the request.

13. The system of claim 11, wherein:

the information further indicates one or more third relationships between a fourth intent and one or more fifth intents; and the second data does not represent a third portion of the information that indicates the one or more third relationships between the fourth intent and the one or more fifth intents.

14. The system of claim 11, wherein:

the third intent is associated with a first confidence score;

the one or more processors are further to determine, based at least on the one or more machine learning models processing the first data and the third data, a second confidence score associated with a fourth intent of the one or more third intents; and the response is generated using the third intent based at least on the first confidence score and the second confidence score.

15. The system of claim 11, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

16. The system of claim 11, wherein the information further indicates:

a first intent level that includes at least the first intent;

a second intent level that includes that includes at least the one or more second intents; and a third intent level that includes at least the one or more third intents.

17. The system of claim 11 wherein:

the one or more machine learning models are trained to determine the first intent;

the one or more machine learning models are not trained to determine the second intent; and the second intent is determined by the one or more machine learning models based at least on the processing the first data.

18. A processor comprising processing circuitry to:

store first data representing one or more relationships between at least first text describing a first intent that one or more machine learning models are trained to determine and second text describing a second intent that the one or more machine learning models are not trained to determine;

determine, based at least on the one or more machine learning models processing second data associated with a query, the first text describing the first intent associated with the query;

determine a portion of the first data that represents one or more of the relationships between the first text describing the first intent and the second text describing the second intent;

apply, to the one or more machine learning models, the second data and the portion of the first data that represents the one or more relationships between the first text describing the first intent and the second text describing the second intent;

determine, based at least on the one or more machine learning models processing the second data and the portion of the first data, the second text describing the second intent that is associated with the query; and cause, based at least on the second text describing the second intent, an output of a response to the query.

19. The processor of claim 18, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

20. The method of claim 1, further comprising:

obtaining additional data representing at least one or more instances of text that are related to the second intent; and applying the additional data to the one or more machine learning models, wherein the determining the second intent that is associated with the request is further based at least on the one or more machine learning models processing the additional data.

* * * * *